US012053655B2

(12) United States Patent
Anderson

(10) Patent No.: US 12,053,655 B2
(45) Date of Patent: Aug. 6, 2024

(54) FIRE EXTINGUISHING ARRANGEMENT

(71) Applicants: Harry Anderson, Bushmills (GB); Mary Helen Anderson, Bushmills (GB)

(72) Inventor: Harry Anderson, Bushmills (GB)

(73) Assignees: Harry Anderson, County Antrim (GB); Mary Helen Anderson, County Antrim (GB)

( * ) Notice: Subject to any disclaimer, the term of this patent is extended or adjusted under 35 U.S.C. 154(b) by 674 days.

(21) Appl. No.: 17/270,734

(22) PCT Filed: Aug. 23, 2019

(86) PCT No.: PCT/EP2019/072654

§ 371 (c)(1),
(2) Date: Feb. 23, 2021

(87) PCT Pub. No.: WO2020/039099

PCT Pub. Date: Feb. 27, 2020

(65) Prior Publication Data

US 2021/0213312 A1 Jul. 15, 2021

(30) Foreign Application Priority Data

Aug. 23, 2018 (GB) ...................................... 1813757

(51) Int. Cl.
*A62C 3/16* (2006.01)
*A62C 37/42* (2006.01)
(Continued)

(52) U.S. Cl.
CPC ................ *A62C 3/16* (2013.01); *A62C 37/42* (2013.01); *D06F 34/20* (2020.02); *D06F 37/42* (2013.01); *D06F 2103/32* (2020.02)

(58) Field of Classification Search
CPC .. A62C 3/00; A62C 3/006; A62C 3/16; A62C 35/11; A62C 35/13; A62C 37/36;
(Continued)

(56) References Cited

U.S. PATENT DOCUMENTS

| | | | | | |
|---|---|---|---|---|---|
| 3,463,236 | A * | 8/1969 | Andersen | A62C 37/12 169/59 |
| 3,889,755 | A * | 6/1975 | Dunn | A62C 3/16 169/59 |

(Continued)

FOREIGN PATENT DOCUMENTS

| | | | | |
|---|---|---|---|---|
| GB | 2205037 A | 11/1988 | | |
| WO | WO-2004062056 A1 * | 7/2004 | | H01H 79/00 |
| WO | 2014/173854 A2 | 10/2014 | | |

OTHER PUBLICATIONS

International Search Report Dated Jan. 24, 2020.

(Continued)

*Primary Examiner* — Darren W Gorman
(74) *Attorney, Agent, or Firm* — Kenner Renner; Arthur M. Reginelli

(57) ABSTRACT

A fire extinguishing arrangement for integration into a domestic clothes dryer, washing machine, refrigerator, freezer, fridge-freezer or dishwasher. The fire extinguishing arrangement has a fire extinguisher that is sized and shaped to be set in the free internal space around the inner workings of a domestic clothes dryer, washing machine, refrigerator, freezer, fridge-freezer or dishwasher. The fire extinguishing arrangement further has a trigger mechanism that is operable to trigger the fire extinguisher to release an extinguishant, a heat detector capable of operating the trigger mechanism when pre-set temperature is reached. The heat detector is further placeable at a remote location to the fire extinguisher. The fire extinguishing arrangement also can also break an
(Continued)

electrical circuit (e.g. to cut the power source to the appliance) when the heat detector detects a pre-set temperature.

17 Claims, 16 Drawing Sheets

(51) Int. Cl.
*D06F 34/20* (2020.01)
*D06F 37/42* (2006.01)
*D06F 103/32* (2020.01)

(58) Field of Classification Search
CPC ......... A62C 37/38; A62C 37/42; D06F 34/20; D06F 37/42; D06F 58/50; D06F 2103/32; D06F 2105/58; D06F 2105/62
See application file for complete search history.

(56) References Cited

U.S. PATENT DOCUMENTS 4,834,188 A 5/1989 Silverman
5,871,056 A * 2/1999 Renna .................... A62C 37/12 169/65
5,936,531 A * 8/1999 Powers .................... H02B 1/28 340/517
6,341,655 B1 1/2002 Busian et al.
8,817,471 B2 * 8/2014 Barna .................... A62C 37/36 174/547
9,109,324 B2 * 8/2015 Chatot .................... D06F 58/50
9,381,390 B1 * 7/2016 Roch ........................ D06F 95/00
2002/0184786 A1 12/2002 Miller
2004/0188102 A1 9/2004 Hall et al.
2004/0194978 A1 * 10/2004 Jerg ........................ A62C 3/16 169/60
2007/0246234 A1 * 10/2007 Vegso .................... A62C 37/12 169/59
2009/0183385 A1 * 7/2009 Lee ........................ D06F 58/50 34/497
2013/0167400 A1 * 7/2013 Stegerwald ............. D06F 37/42 34/524
2013/0174441 A1 * 7/2013 Grunert ................... D06F 58/20 34/524
2016/0296779 A1 * 10/2016 Almutairi ................ A62C 2/12

OTHER PUBLICATIONS

Written Opinion of the International Searching Authority Dated Jan. 24, 2020.
International Preliminary Report on Patentability Dated Feb. 23, 2021.
Examination Report dated Dec. 21, 2023 in corresponding EP Application No. 19 762 731.8 (5 pp).

* cited by examiner

FIRE EXTINGUISHING ARRANGEMENT

CROSS-REFERENCE TO RELATED APPLICATION

The instant application is a national phase of PCT International Application No. PCT/EP2019/072654 filed Aug. 23, 2019, and claims priority to GB Patent Application Serial No. 1813757.0 filed Aug. 23, 2018, the entire specifications of both of which are expressly incorporated herein by reference.

The present invention relates to a fire extinguishing arrangement. In particular, to an arrangement suitable for use in large electrical appliances such as a washing machine and having a heat detector.

Large domestic electrical appliances such as domestic washing machines, refrigerators, domestic clothes dryers, and dishwashers collectively referred to as “white goods” or “major appliances”, can occasionally become faulty and such faults can result in the outbreak of a fire. In the UK alone, there are 60 household fires each week that start because of faulty white goods, and the Grenfell Tower fire, which killed 71 people, is thought to have started by a faulty fridge-freezer. In June 2019 in the UK, a large white goods manufacturer recalled up to 500,000 faulty clothes dryers, also known as “tumble dryers”, which posed a fire safety risk. Some governments, including the UK government, have minimum standards of fire safety for houses in multiple occupation; for example, fire doors and fire alarms are required. However, this, even when coupled with the provision of fire extinguishers near potential fire sources, is not enough to prevent the outbreak and spread of fire. To extinguish a fire at its source, an individual must be present near the source, physically capable of operating the correct extinguishing equipment, and able to remain calm to tackle the fire before it spreads. Additionally, use of the incorrect extinguishant, for example, water on an electrical-appliance fire, can exacerbate the fire or cause electrocution. Collectively, these factors often mean that white goods fires are not extinguished at their source. There is a requirement, therefore, for improved fire safety regarding white goods.

It is an object of the invention to mitigate or obviate the problems associated with fires in electrical appliances.

It is a further object of the invention to mitigate or obviate the problems associated with extinguishing fires at their source, in particular, fires beginning in faulty domestic electrical appliances.

It is a further object of the invention to provide a fire extinguishing arrangement that can eliminate at least one, most preferably two, of the three elements necessary for fire (heat, oxygen and fuel) within a domestic electrical appliance.

According to a first aspect of the invention there is provided a fire extinguishing arrangement for integration into a domestic clothes dryer, washing machine, refrigerator, freezer, fridge-freezer or dishwasher, the domestic clothes dryer, washing machine, refrigerator, freezer, fridge-freezer or dishwasher being powered by an electrical supply, the fire extinguishing arrangement comprising: a fire extinguisher that is sized and shaped such that it can be set in the free internal space around the inner workings of a domestic clothes dryer, washing machine, refrigerator, freezer, fridge-freezer or dishwasher; a trigger mechanism that is operable to trigger the fire extinguisher to release an extinguishant; at least one heat detector capable of operating the trigger mechanism when a pre-set temperature is reached, the heat detector being placeable at a remote location to the fire extinguisher, and; the fire extinguishing arrangement comprising a means for stopping the electrical supply when the heat detector detects a pre-set temperature.

Advantageously, the fire extinguishing arrangement can be integrated into existing appliances by retrofitting the appliance with the fire extinguishing arrangement. Alternatively, the fire extinguishing arrangement could be integrated into the appliance at the point of manufacture. Further advantageously, the fire extinguisher is triggered without requiring any input from a user and can function to extinguish a fire at the source upon detection of the fire by the heat detector. By providing an extinguishant, the fire extinguishing arrangement reduces oxygen thereby removing one the three elements necessary for fire (heat, oxygen and fuel). The appliance can be wired through the means for stopping the electrical supply and, when the heat detector detects a pre-set temperature, the power to the appliance is terminated. The fire extinguishing arrangement thereby reduces the build-up of heat—a further element necessary for fire. By “free internal space around the inner workings” we mean the fire extinguishing arrangement is locatable in a space other than the space used for placement of clothes in a clothes dryer or washing machine, food in a refrigerator, fridge-freezer or freezer, or dishes in a dishwasher.

Ideally, the fire extinguishing arrangement comprises an extinguishant that is non-damaging to electronics, such as carbon dioxide.

Ideally, the fire extinguishing arrangement being sized and shaped to be integrated into a domestic clothes dryer, washing machine, refrigerator, freezer, fridge-freezer or dishwasher occupying the free internal space around the inner workings thereof.

Ideally, the fire extinguishing arrangement can be retrofitted into an existing domestic clothes dryer, washing machine, refrigerator, freezer, fridge-freezer or dishwasher.

Preferably, the fire extinguishing arrangement can be installed without requiring any substantial modification to the domestic clothes dryer, washing machine, refrigerator, freezer, fridge-freezer or dishwasher. By substantial modification we mean not requiring any modification other than wiring the electrical power supply to the fire extinguishing arrangement. Advantageously, the fire extinguishing arrangement can simply be installed without requiring any specialist tools or skills.

Ideally, the fire extinguishing arrangement is a standalone arrangement that does not require an extraneous source of extinguishant.

Preferably, the fire extinguishing arrangement is integrated entirely within the boundary of the domestic clothes dryer, washing machine, refrigerator, freezer, fridge-freezer or dishwasher. Alternatively, part of the fire extinguishing arrangement could be located outside of the boundary of the domestic clothes dryer, washing machine, refrigerator, freezer, fridge-freezer or dishwasher, such as being located at a space behind the domestic clothes dryer, washing machine, refrigerator, freezer, fridge-freezer or dishwasher.

Ideally, the fire extinguishing arrangement has an overall volume of between 300 and 800 $cm^3$.

Preferably, the fire extinguishing arrangement has an overall volume of between 300 and 700 $cm^3$.

Preferably, the fire extinguishing arrangement has an overall volume of between 300 and 600 $cm^3$.

Preferably, the fire extinguishing arrangement has an overall volume of between 350 and 550 $cm^3$.

Preferably, the fire extinguishing arrangement has an overall volume of about 440 $cm^3$.

Ideally, the fire extinguisher and trigger mechanism has main dimensions of about 35 by 210 by 60 mm.

Ideally, the fire extinguishing arrangement comprises a plurality of heat detectors arrangeable at a plurality of locations.

Ideally, all or any of the heat detectors are capable of operating the trigger mechanism.

Advantageously, this increases the number of locations within and/or around an electrical appliance where a fire may be detected by the fire extinguishing arrangement.

Ideally, at least one, most preferably at least two, heat detector(s) is/are calibrated having a pre-set temperature at which heat/fire is detected.

Preferably, each heat detector is calibrated having a pre-set temperature at which heat/fire is detected.

Ideally, at least one of the plurality of heat detectors has a pre-set temperature for heat detection which is a different temperature to that of a pre-set temperature of at least one other heat detector.

Advantageously, this enables a bespoke fire extinguishing arrangement to be constructed tailored to the specific appliance to which it is to be fitted. For example, refrigerators are prone to heating at the rear of the appliance because of the refrigerator cycle and/or the compressor acting on the circulating coolant. If a heat detector disposed at the rear of the refrigerator was calibrated to operate the trigger mechanism at a temperature equal to or below that of the operating temperatures ordinarily experienced at the rear of the refrigerator, then this would cause an unnecessary triggering of the extinguisher and expenditure of the extinguishant.

Ideally, at least one, most preferably at least two, heat detector(s) is/are heat-sensitive and is/are calibrated having a pre-set temperature at which heat/fire is detected.

Preferably, each heat detector is heat-sensitive and is calibrated having a pre-set temperature at which heat/fire is detected.

Ideally, at least one of the heat detectors has a different heat-sensitivity to at least one other heat detector.

Preferably, at least one of the heat detectors has a heat-sensitivity lower than that of at least one other heat detector.

Advantageously, the manufacturer can select heat detectors that trigger at higher temperatures to be disposed on or adjacent to areas where elevated temperatures are ordinarily experienced, for example, at or near the rear of refrigerator, or a heating element of a washing machine or clothes dryer. This reduces the likelihood of an inappropriate triggering.

Preferably, the heat detectors can be set to detect fire at a range of temperatures above 60° C., most preferably, using frangible or low temperature solder fusible links.

Ideally, at least one, most preferably each, heat detector detects heat by mechanical means.

Ideally, at least one, most preferably each, heat detector can operate the trigger mechanism by mechanical means.

Advantageously, the fire extinguishing arrangement and/or the heat detector does not require an electrical power source to operate.

Alternatively, the heat detector could operate by electrically-powered heat detecting means, such as infra-red detection means or other electromagnetic detection means, and could transfer a signal to the trigger mechanism, either through wired or wireless means, to trigger the fire extinguishing arrangement.

Ideally, the means for stopping the electrical supply and the trigger mechanism are configured to be activated together.

Preferably, the trigger mechanism is operable to activate the means for stopping the electrical supply.

Advantageously, the electrical circuit of an appliance such as a washing machine can be wired into the means for stopping the electrical supply. If a fire is detected by the heat detector the trigger mechanism will break the electrical circuit of the appliance which can mitigate the spread of the fire. By cutting off the electrical supply to the appliance, the fire extinguishing arrangement thereby eliminates heat—another of the three elements necessary for fire.

Ideally, the means for stopping the electrical supply comprises an electrical switch, most preferably, a microswitch.

In one embodiment, the fire extinguishing arrangement comprises a means for activating an alarm upon detection of a fire by the heat detector.

Ideally, the means for activating an alarm, the means for stopping the electrical supply, and/or the fire extinguisher are activatable together.

Preferably, the trigger mechanism is operable to activate the means for activating an alarm.

Advantageously, when a fire or excessive heat is detected by the fire extinguishing arrangement an alarm is activated thereby providing an audible and/or visual alarm to alert persons to the fire. The means for activating an alarm may also be arranged to alert emergency services.

Ideally, the means for activating an alarm comprises an electrical switch, most preferably, a microswitch.

Ideally, the electrical switch having a first switch position and a second switch position.

Preferably, the trigger mechanism is operable to move the electrical switch from the first switch position to the second switch position.

Ideally, the means for stopping the electrical supply and the means for activating an alarm are provided by a single microswitch.

Advantageously, a microswitch can be arranged such that the mains electricity, an electrical appliance and an alarm system are all wired through the microswitch. When the switch is set in a first switch position the mains electricity will form a circuit with the appliance whereas when the switch is set in a second switch position the mains electricity will form a circuit with the alarm system. Therefore, when the switch is moved from the first to the second switch position the electricity supply to the appliance is severed and electricity is supplied to an alarm system thereby activating it.

Preferably, the trigger mechanism comprises an activator means for activating the extinguisher to release the extinguishant.

Ideally, the activator means comprising a piercing or rupturing means for piercing or rupturing the extinguisher to release the extinguishant.

Preferably, the piercing or rupturing means is a blunt or pointed object capable of piercing or rupturing a pierceable/rupturable film.

Ideally, the piercing or rupturing means is a spike or other pointed object.

Ideally, the fire extinguisher comprising a pierceable or rupturable membrane.

Preferably, the pierceable or rupturable membrane is correspondingly located to be operably engageable with the piercing/rupturing means.

Ideally, the activator means has an out-of-use position and an activating position.

Preferably, the activator means is movable between the out-of-use position and the activating position.

Ideally, the trigger mechanism comprises a biasing means for biasing the activator means towards the activating position for activating the extinguisher.

Preferably, the trigger mechanism comprises a means for releasably retaining the activator means in the out-of-use position.

Preferably, the means for releasably retaining the activator means in the out-of-use position is operable to counter the biasing force of the biasing means.

Ideally, the biasing means is operable to move the activator means from the out-of-use position to the activating position.

Preferably, at least one heat detector is operably engaged with the means for releasably retaining the activator means in the out-of-use position.

Preferably, on the detection of fire the heat detector causes the means for releasably retaining the activator means in the out-of-use position to release the activator means.

Advantageously, the biasing means moves the activator means to the activating position.

Preferably, the fire extinguishing arrangement, most preferably the trigger mechanism, comprises an operating means for operating the activator means.

Ideally, the operating means operably connects one or more heat detectors to the activator means.

Preferably, forces are exchangeable between the activator means and the one or more heat detectors via the operating means.

Preferably, the means for releasably retaining the activator means in the out-of-use position comprises an operating means.

Ideally, the operating means is an elongate operating means.

Preferably, the operating means, most preferably the elongate operating means comprises an inner cable and at least one sleeve.

Ideally, the inner cable extends through the sleeve.

Ideally, the sleeve is movable relative to the inner cable.

Advantageously, the operating means can be disposed with the inner cable extending against or through a structure, and the sleeve can be moved along the inner cable to apply a force to the structure.

Ideally, the sleeve is retained in a predetermined position relative to the inner cable by the at least one heat detector.

Preferably, upon detection of fire by the heat detector, the sleeve is released and can move relative to the inner cable.

Ideally, the trigger mechanism is configured to trigger the fire extinguisher upon movement of the sleeve relative to the inner cable.

Preferably, the inner cable is capable of being positioned coaxially within the sleeve.

Ideally, the operating means is operably engageable with the biasing means.

Preferably, at least part of the operating means is capable of being tensioned.

Ideally, the inner cable is capable of being tensioned.

Ideally, moving at least part of the operating means in at least one direction can release the biasing force of the biasing means.

Ideally, the operating means is operably engaged with the activator means such that moving and/or tensioning at least part of the operating means can move the activator means.

Preferably, the sleeve is operably engaged with the activator means such that moving the sleeve can increase or decrease movability of the activator means.

Ideally, the operating means is inelastic.

Preferably, the operating means is fire-resistant.

Ideally, the operating means is a Bowden cable.

Advantageously, the operating means remains operable at elevated temperatures. Further advantageously, the operating means is flexible and can be bent and wound into a desired configuration within and/or around a large domestic electrical appliance.

Ideally, the operating means is capable of being anchored or clamped to a surface.

Preferably, the operating means is adapted to be anchored or clamped to a surface.

Ideally, the at least part of the operating means, most preferably the inner cable, is anchored or clamped at one end at or about the fire extinguisher.

Advantageously, wherein the inner cable is clamped to a surface, the sleeve can be moved along the cable. This can be used to impart compressive forces to structures located along the cable.

In one embodiment, the fire extinguishing arrangement comprises an anchor means for anchoring at least part of the operating means, most preferably the inner cable, to a surface.

Ideally, the anchor means comprising an adhesive and/or mechanical fixing means.

In one embodiment, the fire extinguishing arrangement comprises a clamp for clamping at least part of the operating means, most preferably the inner cable, to a surface or structure.

Ideally, the operating means is operably engageable with the heat detector.

Preferably, the heat detector is operably engageable with the activator means via the operating means.

Ideally, the heat detector is operably engageable with the biasing means via the operating means.

Preferably, the operating means is attachable or attached to the heat detector.

Preferably, the heat detector is operably engageable with the sleeve and can locate the sleeve relative to the inner cable.

Preferably, at least part of the heat detector melts, splits, snaps, bursts, collapses, breaks to release and/or otherwise releases at least part of the operating means on the detection of fire.

Ideally, at least part of the heat detector melts, splits, snaps, bursts, collapses, breaks to release and/or otherwise releases at least part of the operating means at a pre-set temperature.

Preferably, when at least part of the heat detector melts, splits, snaps, bursts, collapses or breaks it frees the sleeve to move along a part of the inner cable.

Ideally, at least one heat detector comprises metal arranged to melt and/or break at a predetermined temperature.

Alternatively or additionally, at least one heat detector comprises a frangible material arranged to melt and/or break at a predetermined temperature.

Preferably, at least one heat detector comprises a frangible bulb such as a glass bulb.

In this embodiment, the heat detector can be formed as a frangible bulb containing an expandable substance which expands under elevated temperatures to break the bulb.

Ideally, when the bulb is broken the sleeve is free to move along a part of the inner cable.

In one embodiment, the operating means extends between a plurality of heat detectors.

In another embodiment, the fire extinguishing arrangement comprises a plurality of operating means extending between a plurality of heat detectors, wherein at least one operating means extends from at least one heat detector to at or about the activator means and is in operable engagement with the activator means.

Preferably, the activator means comprises an activator means support component, the piercing or rupturing means being disposed on or about the activator means support component.

Ideally, the fire extinguishing arrangement comprises a fire extinguisher support component, the fire extinguisher being disposed on or about the fire extinguisher support component.

Ideally, the activator means and the fire extinguisher are movable relative to one another.

Preferably, the activator means support component and the fire extinguisher support component are movable relative to one another.

Preferably, the activator means support component is movably connected, most preferably hingedly connected, to the fire extinguisher support component.

Ideally, the activator means support component is hingedly connected at one end to the fire extinguisher support component.

Preferably, the fire extinguishing arrangement comprises a hinge arranged between the fire extinguisher support component and the activator means support component.

By hinge we mean either a purpose-built hinge of the type known, or a piece of material capable of bending.

Ideally, the hinge being formed form malleable material, most preferably a single piece of malleable material.

Ideally, the hinge being formed form malleable metal, most preferably a single piece of malleable metal.

Advantageously, using a malleable material reduces the complexity of the arrangement and the cost when compared to a purpose-built hinge such as those used on doors etc.

Ideally, the operating means, most preferably the inner cable, is anchored at or about, most preferably to, the hinge.

Most preferably, the hinge comprises a flange.

Ideally, the flange extends from a portion of the hinge arranged at the activator means support component.

Ideally, the flange comprises an aperture for receiving at least part of the operating means.

Preferably, the operating means is anchored such that the activator means is locatable between the operating means and the extinguisher.

Preferably, the operating means is anchored such that the activator means support component is between the anchor point of the operating means and the fire extinguisher support component.

Ideally the biasing means is operably connected to the fire extinguisher support component and/or the activator means support component.

Preferably, the biasing means comprises a support, ideally the biasing means support is connected to the fire extinguisher support component.

Ideally, the biasing means comprises a spring, most preferably a coil spring.

Preferably, the fire extinguishing arrangement comprises an adjuster for adjusting the biasing force of the biasing means.

Ideally, the fire extinguishing arrangement comprises a connector for connecting the biasing means to the activator means support component.

Preferably, the fire extinguishing arrangement, most preferably the trigger mechanism, comprises at least one urging means for urging a part of the operating means against a structure.

Ideally, the urging means is operable to urge the sleeve against a structure.

Preferably, the urging means is operable to move the sleeve relative to the inner cable.

Preferably, the means for releasably retaining the activator means in the out-of-use position is operable to retain at least part of the activator means support component at a distance from the fire extinguisher support component.

Most preferably, the means for releasably retaining the activator means in the out-of-use position comprises at least one urging means.

Preferably, the urging means is operable to urge the sleeve along the inner cable.

Ideally, the at least one urging means being disposed at or about the heat detector.

Ideally, the heat detector is operably integrated with the urging means.

Preferably, the heat detector and the urging means operate together to retain the sleeve in a predetermined position relative to the inner cable.

Preferably, the fire extinguishing arrangement comprises a retaining element for retaining the activator means in the out-of-use position.

Ideally, the retaining element has a retaining position and a release position and is movable between said positions.

Preferably, the means for releasably retaining the activator means in the out-of-use position comprises a retaining element for retaining the activator means in the out-of-use position.

Ideally, the retaining element is operable to retain at least part of the activator means support component at a distance to the fire extinguisher support component.

Preferably, the operating means is operably engageable with the retaining element.

Ideally, the sleeve of the operating means is retained on one side of the retaining element whereas the inner cable extends through to the other side of the retaining element.

Preferably, the retaining element and the operating means are operable to counter the biasing force of the biasing means.

Ideally, the retaining element, the urging means and the operating means are operable to counter the biasing force of the biasing means.

Ideally, the retaining element is operably coupled to the activator means support component and/or the fire extinguisher support component.

Preferably, the retaining element comprises an aperture for receiving at least part of the operating means.

Ideally, the retaining element comprises an aperture for receiving the inner cable of the operating means.

Ideally, the retaining element is movably connected, most preferably hingedly connected, to the fire extinguisher support component.

Alternatively, the retaining element is movably connected, most preferably hingedly connected, to the activator means support component.

Ideally, the retaining element is formed from a malleable material, most preferably a malleable metal.

Preferably, the retaining element is elongate and extends from the fire extinguisher support component or the activator means support component.

Ideally, the retaining element aperture is located distal to the fire extinguisher support component or the activator means support component.

Preferably, the operating means, most preferably the inner cable, is disposed within the retaining element aperture.

Ideally, at least part of the operating means extends through the retaining element aperture.

Ideally, the inner cable extends through the retaining element aperture.

Ideally, the retaining element comprises a recess or aperture for receiving and retaining at least part of the activator means support component.

Preferably, when at least part of the activator means support component is located in the recess or aperture, at least part of the retaining element is located between the activator means support component and the fire extinguisher support component such that the retaining element can oppose the biasing force of the biasing means.

Ideally, the operating means is operable to force the retaining element against the activator means support component.

Preferably, when the operating means forces the retaining element against the activator means support component, the activator means support component is retained in the out-of-use position.

Ideally, when the force applied by the operating means to force the retaining element against the activator means support component is reduced or removed, the biasing force of the biasing means overcomes the retaining element to draw the activator means towards the activating position.

By overcome, we mean the ability of the retaining element to retain the activator means in the out-of-use position, which is partially a result of the operating means forcing the retaining element against the activator means support component, is overcome.

Preferably, the sleeve extends between the retaining element and the urging means.

Preferably, the sleeve length is adjustable.

Advantageously, the operating means can be used to string a number of structures together, for example, the hinge, the retaining element, and a plurality of heat detectors via the inner cable. The inner cable can be retained at or about the hinge on the side of the retaining element opposed to the sleeve and at the other end to an urging means. The sleeve can then be arranged between the structures, such as the urging means and the retaining element, and the structures can be configured to transfer forces along the operating means by moving and urging the sleeve along the inner cable. Whereas the inner cable provides shape and structure to the operating means, the sleeve enables the transfer of forces along the operating means relative to the inner cable. It will be understood that multiple sleeves may be used of varying lengths to create a bespoke fire extinguishing arrangement with heat detectors arranged at predetermined locations relative to the extinguisher. It will further be understood that the urging means are each movable along the inner cable such that movement of one urging means at one end of the operating means can correspondingly move downstream sleeve and urging means along the inner cable.

Preferably, the urging means is operable to urge the sleeve against the retaining element.

Ideally, the urging means is operable to urge the sleeve against the retaining element and towards the activator means support component.

Ideally, the urging means releasably urges the sleeve against the retaining element.

Preferably, the fire extinguishing arrangement can be set by moving the activator means to the out-of-use position, placing a portion of the activator means support component in abutment with the retaining element recess and by configuring the urging means to urge the sleeve against the retaining element.

Advantageously, this can be done by moving/bending the retaining element towards the activator means support component and adjusting the urging means. The urging means can be arranged such that it compresses a heat detector (e.g. frangible bulb) or is holding a heat detector (e.g. a fusible link) in tension. A cap or other stop means can be placed on the operating means to prevent the urging means from moving along the inner cable away from the location of retaining element on the cable. Next, the biasing means may be connected to the activator means support component to prime the fire extinguishing arrangement.

Ideally, the operating means comprises a plurality of sleeves disposed along the inner cable.

Preferably, the urging means is operable to engage with the sleeve(s).

Ideally, the urging means is operable to retain two sleeves at a distance from one another along the inner cable.

Preferably, the urging means can releasably locate and retain a sleeve relative to the inner cable.

Ideally, the urging means can releasably locate and retain a sleeve relative to the inner cable and is operable to move a single sleeve away from a fixed point on the operating means such as a clamp.

Ideally, the urging means can move two sleeves apart.

Preferably, the urging means comprises a first component for engaging with the sleeve or a first sleeve and moving the sleeve relative to the inner cable.

Preferably, the urging means comprises a second component for engaging with a stopper on the inner cable or a second sleeve, most preferably being operable to move the second sleeve relative to the inner cable.

Ideally, the operating means, most preferably the inner cable, extends through and between the first component and the second component.

Preferably, the inner cable of the operating means extends through and between the first component and the second component, but the sleeve is retained such that it does not extend between first component and second component.

Preferably, the urging means comprises a separator for retaining at least part of the first component at a distance from at least part of the second component.

Ideally, in one embodiment, the separator is disposed extending between the first component and the second component.

Ideally, in one embodiment, the separator can be used to increase the distance between the first component and the second component. This correspondingly increases the distance between the first sleeve and the second sleeve.

Ideally, the separator is operable to force at least part of first component away from at least part of the second component in at least one direction.

Preferably, the separator is operable to retain at least part of the first component at a distance to at least part of the second component.

Ideally, the separator is integrally formed with the first and/or second component.

Advantageously, this reduces the number of separate components in the fire extinguishing arrangement.

In one embodiment, the first component and the second component are the same shape and size.

Advantageously, this further reduces the manufacturing steps as the same piece can be used for the first and second component.

Preferably, the first component and second component are pivotally arranged relative to one another, most preferably, via the separator.

Ideally, the heat detector is appended to the urging means.

Preferably, the heat detector is appended to the first component and/or the second component.

Ideally, the heat detector is arranged extending between the first component and the second component.

In one embodiment, the urging means is arranged such that pivot point between the first component and the second component is located between the heat detector and the operating means, most preferably, the inner cable.

Ideally, the urging means is arranged such that the separator is located between the heat detector and the operating means, most preferably, the inner cable.

Ideally the first component and/or the second component are pivotable about the separator.

Advantageously in this embodiment, where the sleeve is urged towards the first component, the first component pivots about the separator towards the second component and consequently applies tension to the heat detector. The tension is releasable when the heat detector detects heat and separates. This is an appropriate configuration where the heat detector is a fusible link.

In an alternative embodiment, the urging means is arranged such that operating means, most preferably the inner cable, is located between the location of the pivot point of the first component and the second component and the heat detector.

Preferably, the urging means is arranged such that operating means, most preferably the inner cable, is located between the separator and the heat detector.

Advantageously in this embodiment, where the sleeve is urged towards the first component, the first component pivots about the separator towards the second component and consequently applies a compression force to the heat detector. The force is releasable when the heat detector detects heat and collapses. This is an appropriate configuration where the heat detector is a glass bulb.

Ideally, the urging means is configured such that the heat detector can be placed such that the pivot point of the first component and the second component is located between the heat detector and the operating means, or placed such that the operating means is located between the heat detector and the pivot point of the first component and the second component.

Advantageously, a single urging means can be configured to apply a compression force or tension force to the heat detector and therefore only one type of urging means needs to be manufactured. The manufacturer can select the most suitable configuration depending on the type of heat detector used.

Ideally, the urging means is configured such that the heat detector can be placed such that the separator is between the heat detector and the operating means, or placed such that the operating means is between the heat detector and the separator.

Preferably, the heat detector is operable to increase the distance between at least part of the first component and at least part of the second component, or to retain at least part of the first component at a set distance from at least part of the second component until the detection of a pre-set temperature by the heat detector.

Advantageously, this further urges at least one sleeve along the inner cable and can be configured to increase the urging force of the sleeve against the retaining element. Further advantageously, when the heat detector detects heat/fire and releases the sleeve, the sleeve is free to move along a part of the inner cable and the urging force is released. The biasing means can then move the activator means to the activating position, the activator means forcing the retaining element into the release position as it moves towards the activating position.

Ideally, the biasing means biases the activator means support component towards the fire extinguisher support component.

Preferably, the biasing means opposes the urging force of urging means acting on the retaining element via the operating means.

Preferably, the retaining element can transfer the biasing force of the biasing means to a pushing force which opposes the urging force of the urging means via the operating means.

Preferably, the biasing means is operably connected to and extends from the biasing means support.

Preferably, the biasing means extends from the activator means support component to the biasing means support.

Preferably, the fire extinguisher support component is located between the activator means support component and the biasing means support.

Ideally, the fire extinguisher support component comprises an aperture for accommodating the biasing means.

Preferably, the biasing means extends from the activator means support component, through the fire extinguisher support component biasing means aperture, to the biasing means support.

Ideally, the fire extinguishing arrangement comprises an attachment means for attaching at least part of the trigger mechanism to a surface.

Ideally, the attachment means comprises mechanical fixing means and/or adhesives or other suitable means for fixing at least part of the trigger mechanism to a surface, such as an appliance.

Preferably, the fire extinguishing arrangement comprises a support bracket.

Ideally, the support bracket extends from the fire extinguisher support component, most preferably orthogonally from the fire extinguisher support component.

Preferably, the support bracket extends alongside the activator means support component to a point where objects appended to the support bracket may overhang the activator means and/or the activator means support component.

Preferably, the means for stopping the electrical supply and/or the means for activating an alarm are disposed on the support bracket.

Preferably, the support bracket is adaptable to be fixed to a surface.

Ideally, the means for stopping the electrical supply and/or the means for activating an alarm are activated when the means for releasably retaining the activator means in the out-of-use position is released and the activator means moves to the activating position.

Ideally, the means for stopping the electrical supply and/or the means for activating an alarm are activated when the activator means support component is moved towards the fire extinguisher support component.

Preferably, the means for stopping the electrical supply and/or the means for activating an alarm comprise a switch which, when operated, breaks an electrical circuit and/or sounds an alarm that is operably engaged with the means for stopping the electrical supply and/or the means for activating an alarm.

Ideally, the trigger mechanism, most preferably the activator means support component is operably engaged with the switch such that the trigger mechanism/activator means support component can operate the switch.

Preferably, the means for stopping the electrical supply and/or the means for activating an alarm are activated when the urging force of the sleeve is released.

Ideally, the switch is operably moved when the urging force of the sleeve is released.

Ideally, the means for stopping the electrical supply and/or the means for activating an alarm are activated when the activator means support component is moved towards the fire extinguisher support component when the trigger mechanism is operated.

Preferably, the fire extinguishing arrangement comprises a plurality of fire extinguishers, each fire extinguisher being triggerable by the trigger mechanism.

Ideally, the fire extinguishing arrangement comprises a plurality of trigger mechanisms corresponding to each fire extinguisher.

Ideally, the one or more heat detectors can operate at least one, most preferably all, of the trigger mechanisms.

Preferably, the extinguishant is suitable for extinguishing electrical fires.

Preferably, the extinguishant is gaseous at atmospheric temperature and pressure.

Advantageously, gas extinguishants will not compromise the overall integrity of the appliance, for example, if the fire extinguishing arrangement is inappropriately triggered.

Ideally, the extinguishant comprises carbon dioxide.

Preferably, the fire extinguisher is a pressurised cannister.

Ideally, the fire extinguisher is sized to be placed within internal free space of a large domestic electrical appliance.

Preferably, the fire extinguishing arrangement comprises a means for lowering and/or maintaining the temperature of the fire extinguisher.

Ideally, the fire extinguishing arrangement comprises a means for detecting a temperature of the fire extinguisher outside of a safe operating temperature.

Advantageously, where the fire extinguisher is a pressurised cannister, this prevents the fire extinguisher from being heated to above safe temperatures.

Ideally, the means for lowering/maintaining the temperature of the fire extinguisher is operable to lower the temperature of the fire extinguisher to less than 60° C.

Ideally, the means for lowering/maintaining the temperature of the fire extinguisher is operable to lower the temperature of the fire extinguisher to less than 50° C.

Ideally, the means for lowering/maintaining the temperature of the fire extinguisher is operable to lower the temperature of the fire extinguisher to less than 40° C.

Ideally, the means for detecting a temperature of the fire extinguisher outside of a safe operating temperature comprises an electrical cut-off means for cutting off the electrical supply when a predetermined temperature is reached.

Ideally, the electrical cut-off means comprises a thermal fuse.

Preferably, the electrical cut-off means is adaptable to be connected to mains electricity, to the means for stopping the electrical supply, and/or to an electrical appliance.

Ideally, the electrical cut-off means can be placed at or around or attached to the fire extinguisher.

Advantageously, the mains electricity can be wired to the electrical cut-off means and then to the to the appliance. Therefore, if the fire extinguishing arrangement is in a washing machine, for example, and the temperature about the fire extinguisher rises above a safe temperature, either during normal operation or during outbreak of a fire, the electrical cut-off means will cut the electrical supply to the appliance. This will prevent the temperature from exceeding safe temperatures. Further advantageously, the electrical cut-off means can cut off the electrical supply to the electrical appliance even before the trigger mechanism has been triggered by a fire, thus providing a secondary safety electrical cut off mechanism in addition to the means for stopping the electrical supply, which is activated along with the trigger mechanism.

Ideally, the electrical cut-off means cuts of an electrical supply when the temperature at or about the electrical cut-off means is equal to or below 70° C.

Ideally, the electrical cut-off means cuts of an electrical supply when the temperature at or about the electrical cut-off means is equal to or below 60° C.

Ideally, the electrical cut-off means cuts of an electrical supply when the temperature at or about the electrical cut-off means is equal to or below 50° C.

Ideally, the electrical cut-off means cuts of an electrical supply when the temperature at or about the electrical cut-off means is equal to or below 40° C.

In one embodiment, the means for lowering/maintaining the temperature of the fire extinguisher comprises a fan or other cooling means.

Ideally, the fire extinguishing arrangement comprises anti-corrosion means.

Ideally, at least part of the fire extinguishing arrangement is coated in anti-corrosion substances.

Preferably, at last part of the fire extinguishing arrangement is oiled/greased.

Preferably, the fire extinguishing arrangement comprises an enclosure for enclosing at least part of the fire extinguishing arrangement.

Advantageously, moving parts can be kept within the enclosure to reduce risk of injury when installing the fire extinguishing arrangement, for example.

Preferably, at least part of the trigger mechanism and/or fire extinguisher are located within the enclosure.

Ideally, the operating means extends out of the enclosure.

Ideally the enclosure comprises an aperture for accommodating the operating means.

Preferably, the enclosure comprises at least one vent to allow the extinguishant to escape.

Ideally, the enclosure comprises a bracket, adhesives or other means for attaching the enclosure to a surface, such as an interior surface of a large domestic electrical appliances.

Ideally, the means for activating an alarm, the means for stopping the electrical supply and/or the electrical cut-off means are electrically couplable through the enclosure.

Ideally, the means for activating an alarm, the means for stopping the electrical supply and/or the electrical cut-off means are wired to a surface of the enclosure, the wiring being accessible from an exterior surface of the enclosure.

According to a second aspect of the invention there is provided a fire extinguishing arrangement, the fire extinguishing arrangement comprising:

- a fire extinguisher,
- a trigger mechanism, the trigger mechanism being operable to trigger the fire extinguisher to release an extinguishant, and
- at least one heat detector capable of detecting a fire and operating the trigger mechanism.

Ideally, the electrical appliance is a washing machine, refrigerator, fridge-freezer, clothes dryer, dishwasher or other white goods electrical appliance.

Ideally, the fire extinguishing arrangement is sized and shaped to be integrated into a large domestic electrical appliance.

Preferably, the fire extinguishing arrangement is adapted to occupy the free internal space around the inner workings of a large domestic electrical appliance.

Ideally, the fire extinguishing arrangement can be installed without requiring any substantial modification of the large domestic electrical appliance.

Ideally, the fire extinguishing arrangement can be installed without requiring any fixings to be applied between the fire extinguishing arrangement and the appliance.

Preferably, the fire extinguishing arrangement is a stand-alone arrangement that does not require an extraneous source of extinguishant.

Advantageously, it is not required to plumb the arrangement into a water source, for example.

Ideally, the heat detector is placeable at a remote location to the fire extinguisher.

Ideally, the fire extinguishing arrangement comprises a means for stopping the electrical supply upon detection of a fire by the heat detector.

According to a third aspect of the invention there is provided an electrical appliance comprising a fire extinguishing arrangement, the fire extinguishing arrangement comprising:

- a fire extinguisher,
- a trigger mechanism, the trigger mechanism being operable to trigger the fire extinguisher to release an extinguishant, and
- at least one heat detector capable of detecting a fire and operating the trigger mechanism.

Ideally, the electrical appliance is a washing machine, refrigerator, fridge-freezer, clothes dryer, dishwasher or other white goods electrical appliance.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

The invention will now be described with reference to the accompanying drawings which shows by way of example only three embodiments of an apparatus in accordance with the invention.

FIG. 13(*b*) is a circuit symbol for an infra-red heat detector;

Figure 12:
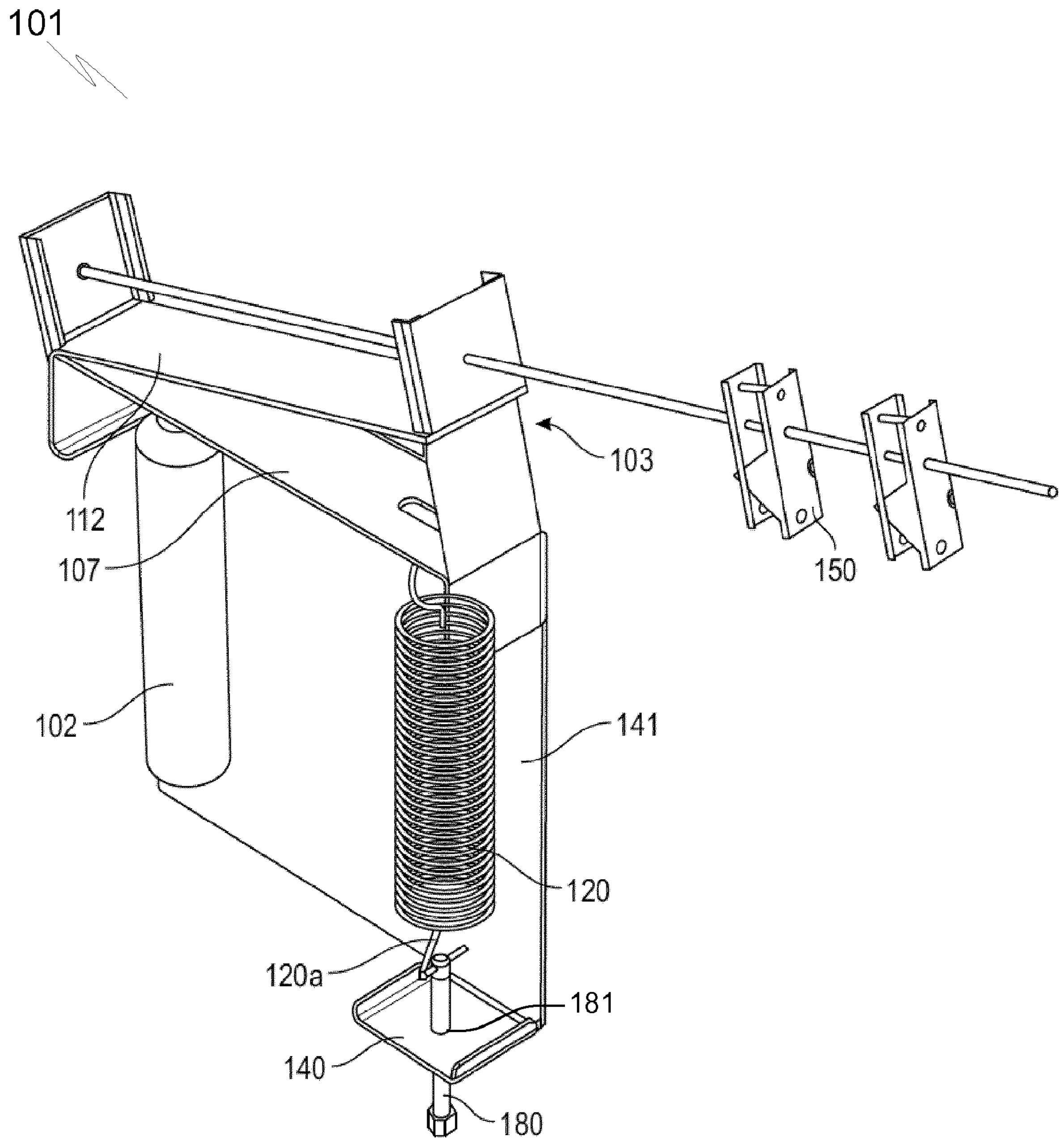
FIG. 12 is a perspective view of a further embodiment of a fire extinguishing arrangement according to the invention.
Figure 19:
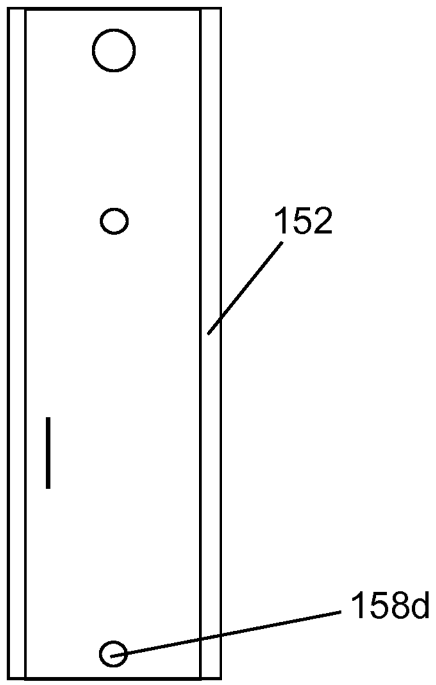
FIG. 19 is a front view of a component of an urging means.
Figure 20:
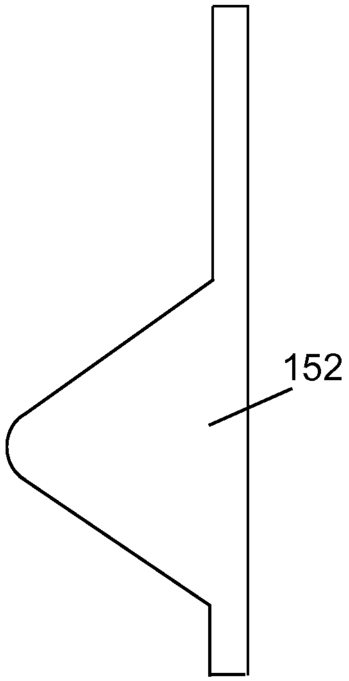
FIG. 20 is side view of the urging means component of FIG. 19.
Figure 21:
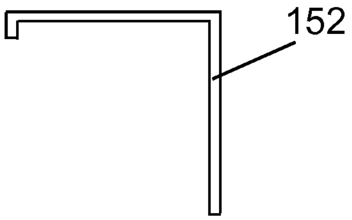
Figure 22:
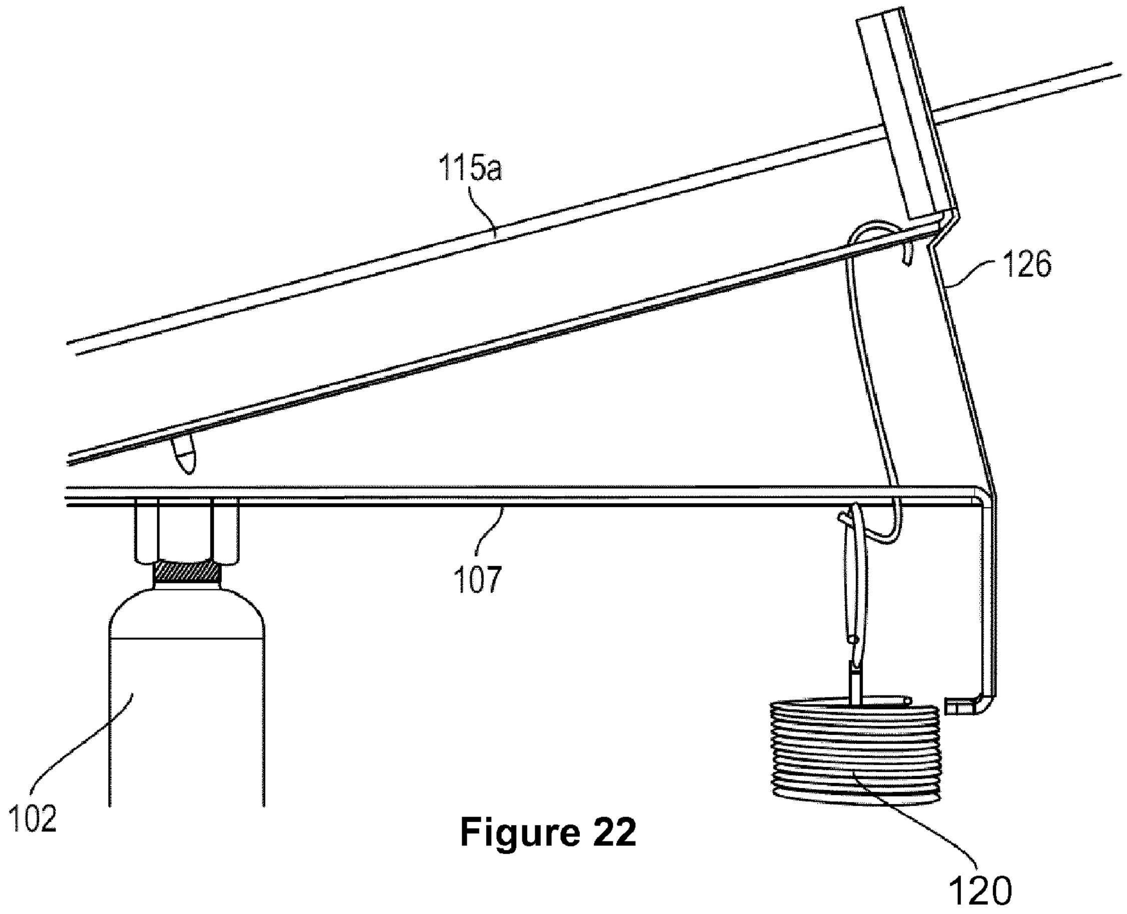

FIG. 21 top view of the urging means component of FIG. 19;

FIG. 22 is an expanded side view of the embodiment of FIG. 12.

Figure 23:
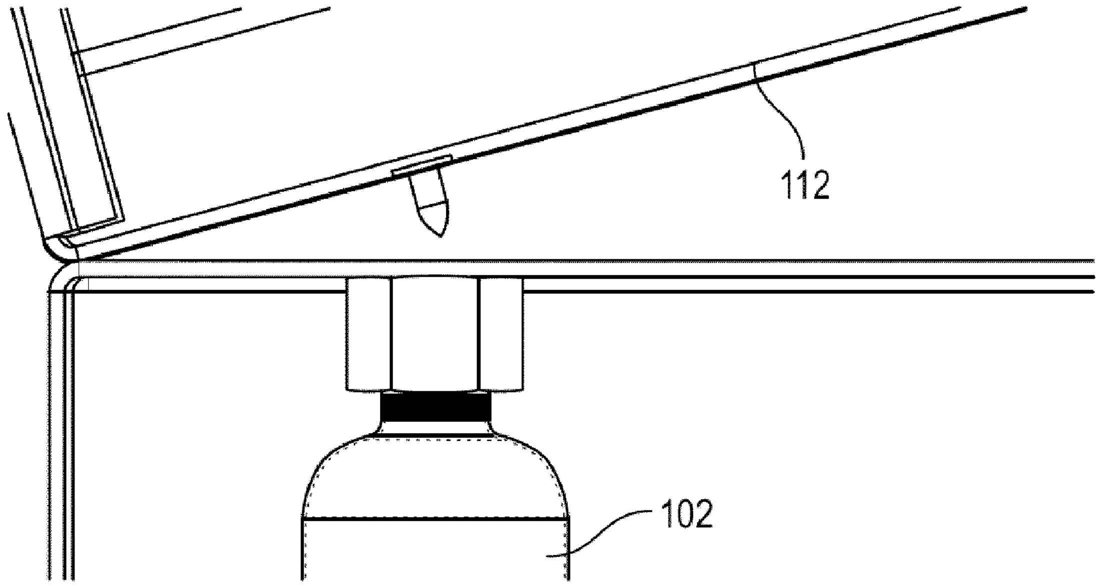

FIG. 23 is a further expanded view of FIG. 22.

Figure 24:
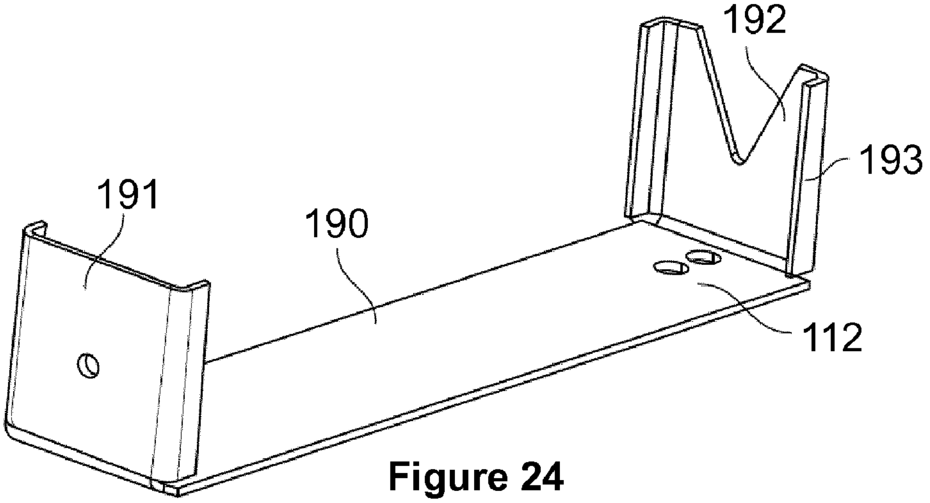

FIG. 24 is a component part of the fire extinguisher apparatus.

Figure 25:
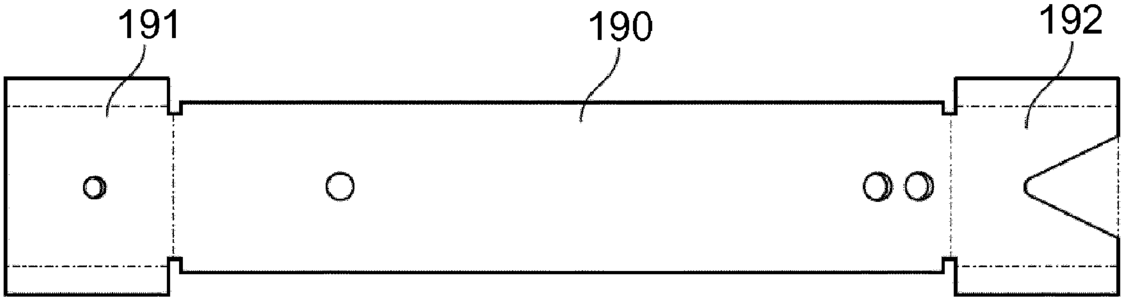

FIG. 25 is the component part of FIG. 24 before forming into shape for use.

Figure 26:
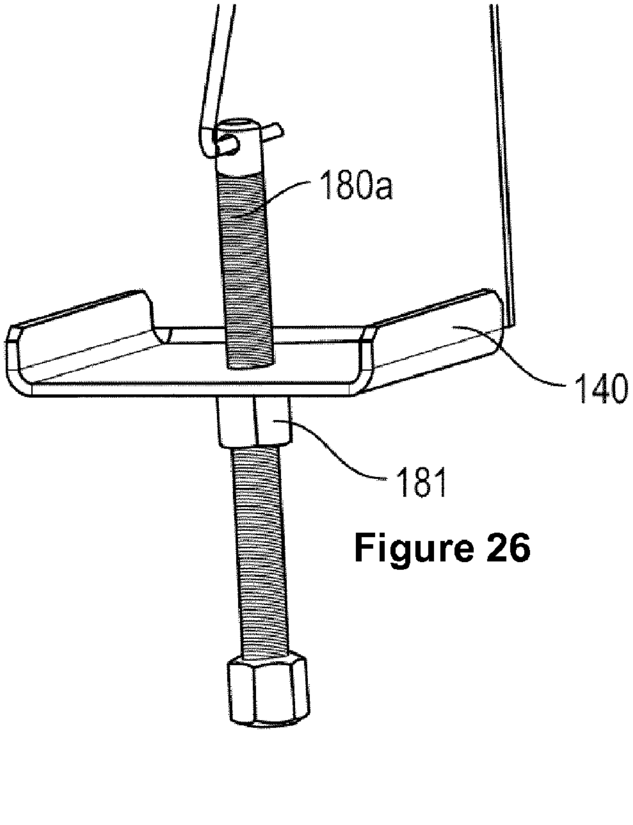

FIG. 26 is an expanded view of a part of the embodiment of FIG. 12.

Figure 27:
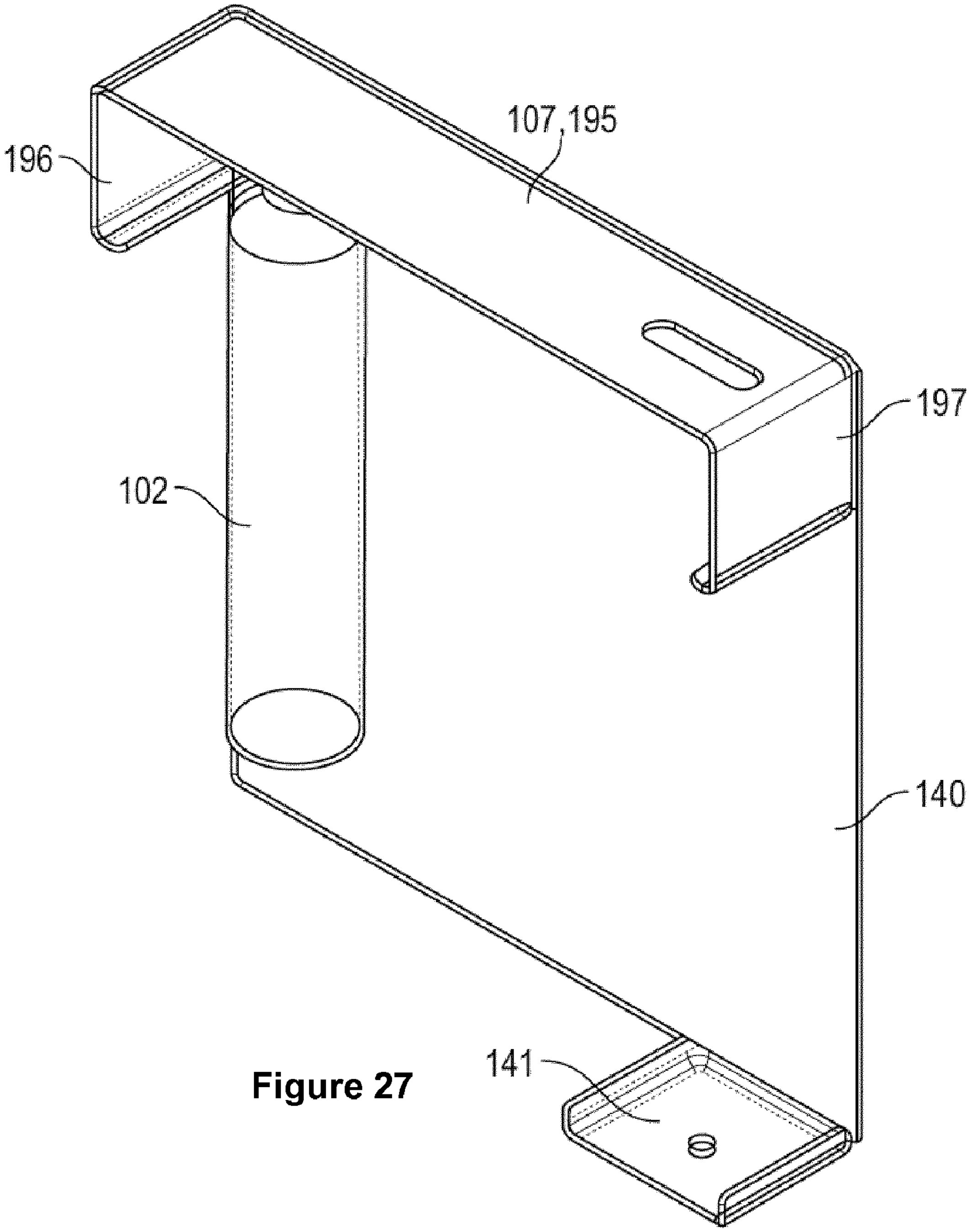

FIG. 27 is a perspective view of a part of the embodiment of FIG. 12.

Figure 28:
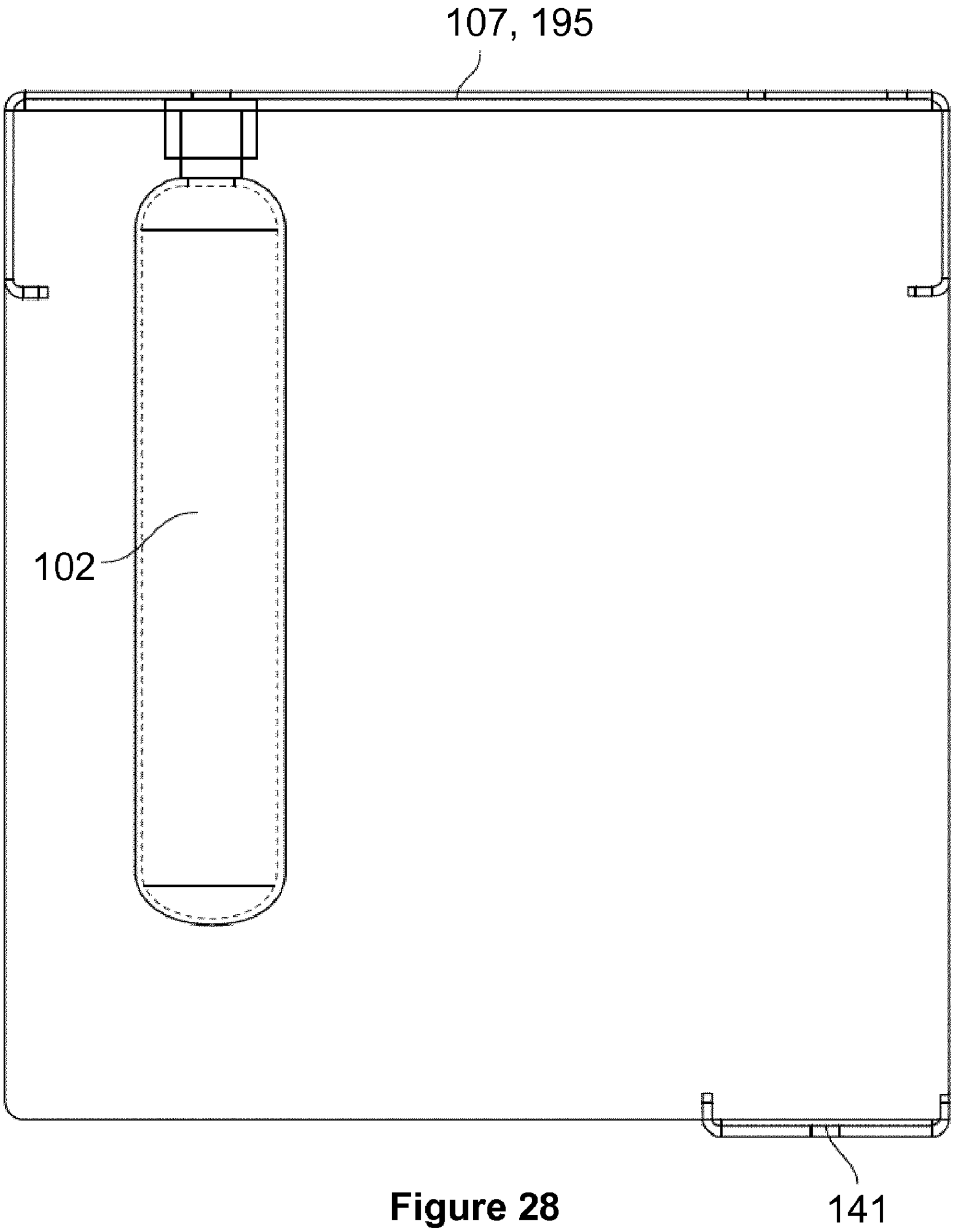

FIG. 28 is a side view of a part of the embodiment of FIG. 12.

Figure 1:
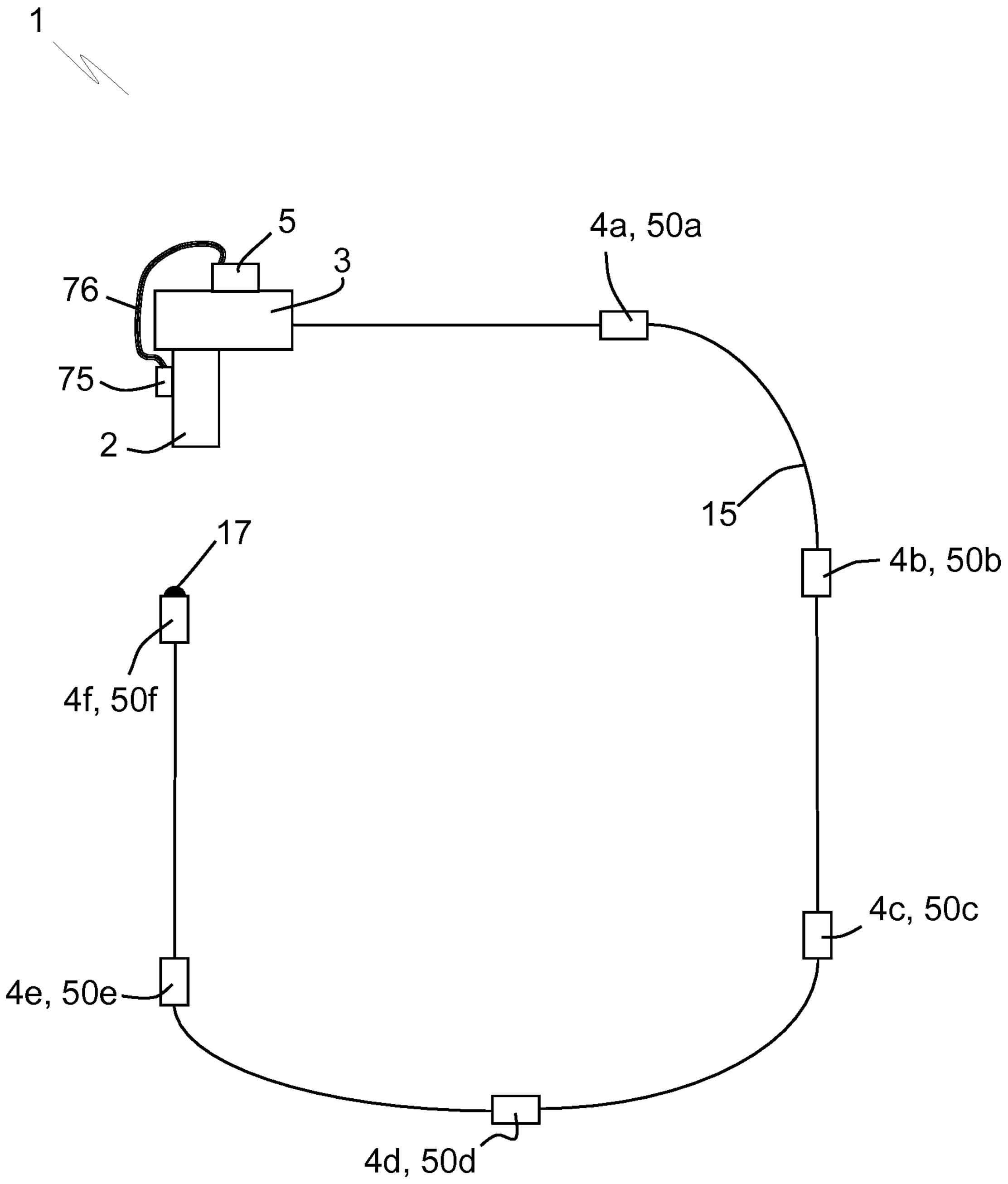
FIG. 1 is a schematic diagram of a fire extinguishing arrangement according to the invention.
Figure 5:
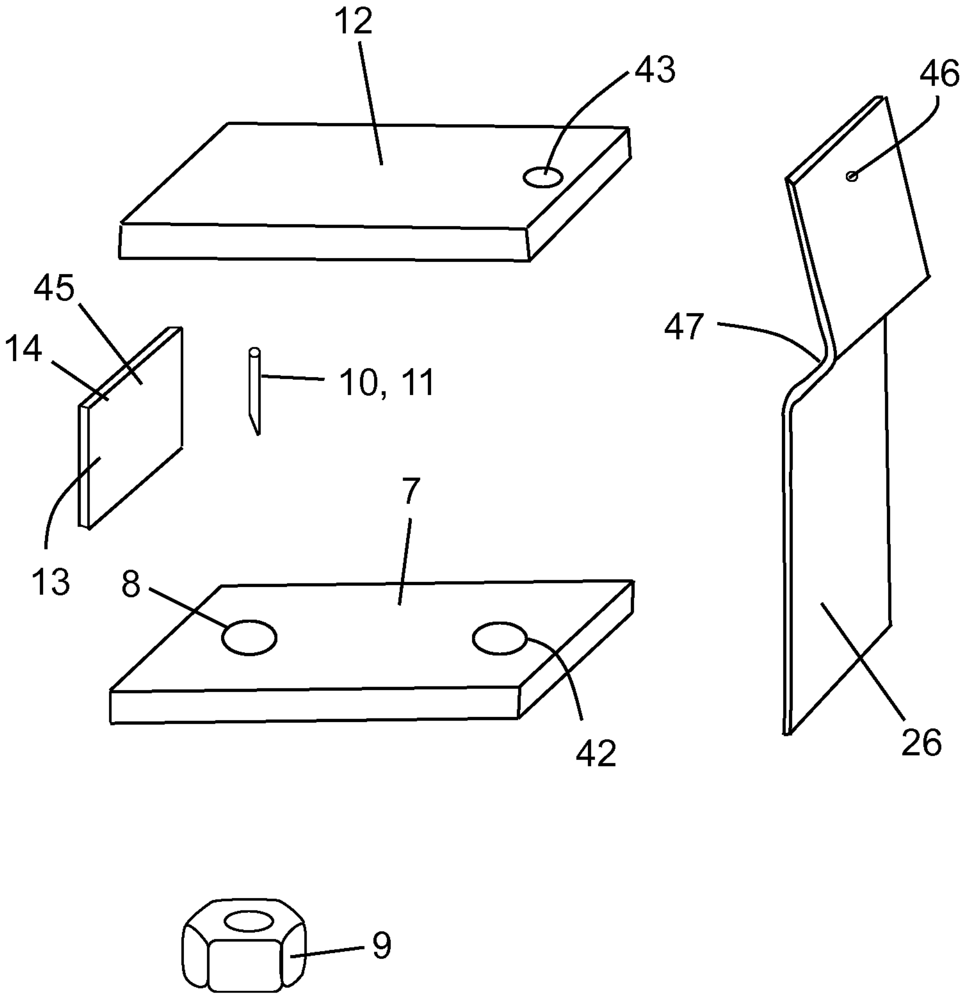
FIG. 5 is an expanded view of component parts of the fire extinguishing arrangement.
Figure 10:
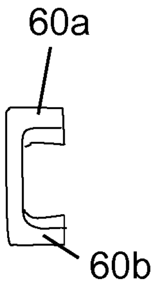
FIG. 10 is an end view of the component part in FIG. 8.
Figure 11:
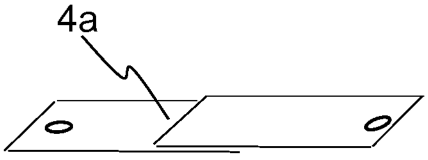
FIG. 11 is a perspective view of the heat detector shown in FIG. 6.

In FIG. 1 there is shown a schematic representation of a fire extinguishing arrangement indicated generally by reference numeral 1. The arrangement 1 involves a fire extinguisher 2, which contains pressurized carbon dioxide although other suitable extinguishants could feasibly be used, and a trigger mechanism 3 operable to trigger the fire extinguisher 2 to release the extinguishant. The fire extinguishing arrangement 1 further involves six heat detectors 4*a-f*. The heat detectors 4*a-f* are placeable at locations distal to and remote from the fire extinguisher 2 or they may be placed beside the fire extinguisher 2 as required. Each heat detector 4*a-f* is formed as a fusible metal link 4*a-f* (see also FIGS. 5 and 10). Any number of heat detectors could be used with the arrangement. Each fusible link 4*a-f* can be arranged at a different location, for example in and around an electrical appliance, and each is capable of melting and operating the trigger mechanism 3. The fusible links 4*a-f* are pre-set at different melting temperatures such that heat detectors that trigger at higher temperatures can be disposed adjacent to areas of an appliance that are prone to heating during use. In this embodiment, fusible links 4*a*, 4*b*, 4*e* and 4*f* melt at 60° C. whereas links 4*c* and 4*d* melt at 110° C. These temperatures are adjustable by altering the fusible link or other heat detector as required. The fire extinguisher 2 and trigger mechanism 3 has main dimensions of 35 by 210 by 60 mm. By main dimensions we mean these dimensions exclude the size and shape of the operating means which extends from at or about the fire extinguisher 2 as discussed in detail below. Alternative sizes and shapes could be used provided the fire extinguishing arrangement can be integrated into a large domestic electrical appliance, and, in particular, provided that the fire extinguisher 2 can be placed in the free internal space around the inner workings of a large domestic appliance. While it would be preferable that the entire fire extinguishing arrangement 1 is located entirely within the boundary of the appliance after installment, there is often some free space between the rear of the appliance and the wall at which it sits against. This space could also be occupied by part of the fire extinguishing arrangement 1 if required. The entire fire extinguishing arrangement 1 can be set around the inner workings of a domestic clothes dryer, washing machine, refrigerator, freezer, fridge-freezer or dishwasher occupying the free internal space thereof, and it is not required to modify the appliance, for example, by applying any fittings or fixings to internal surfaces, making the arrangement 1 easy to install. Furthermore, it is not required to plumb the fire extinguishing arrangement 1 into a water source or other source of extinguishant.

Figure 2:
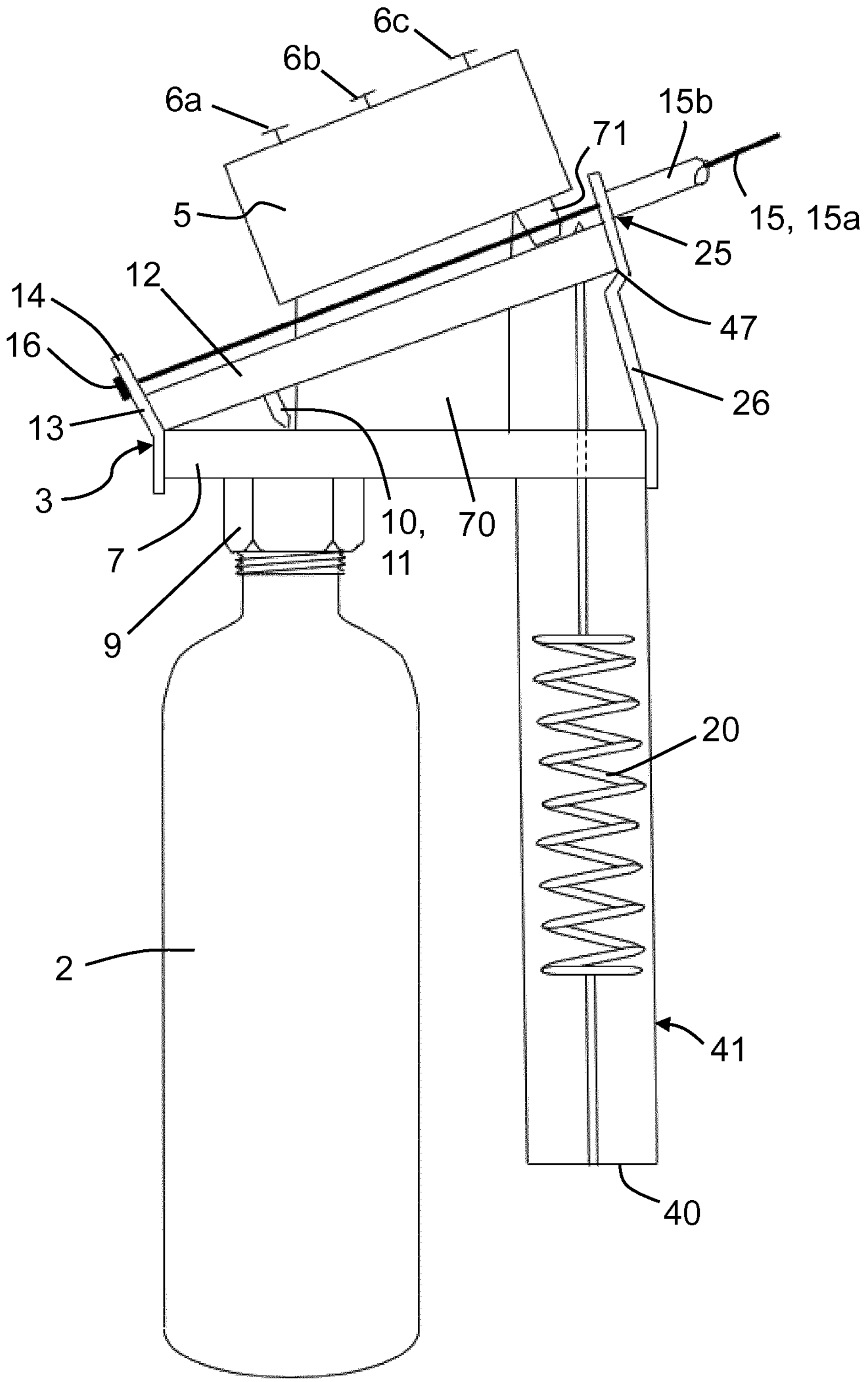
FIG. 2 is a side elevation view of a part of a fire extinguishing arrangement according to the invention.
Figure 3:
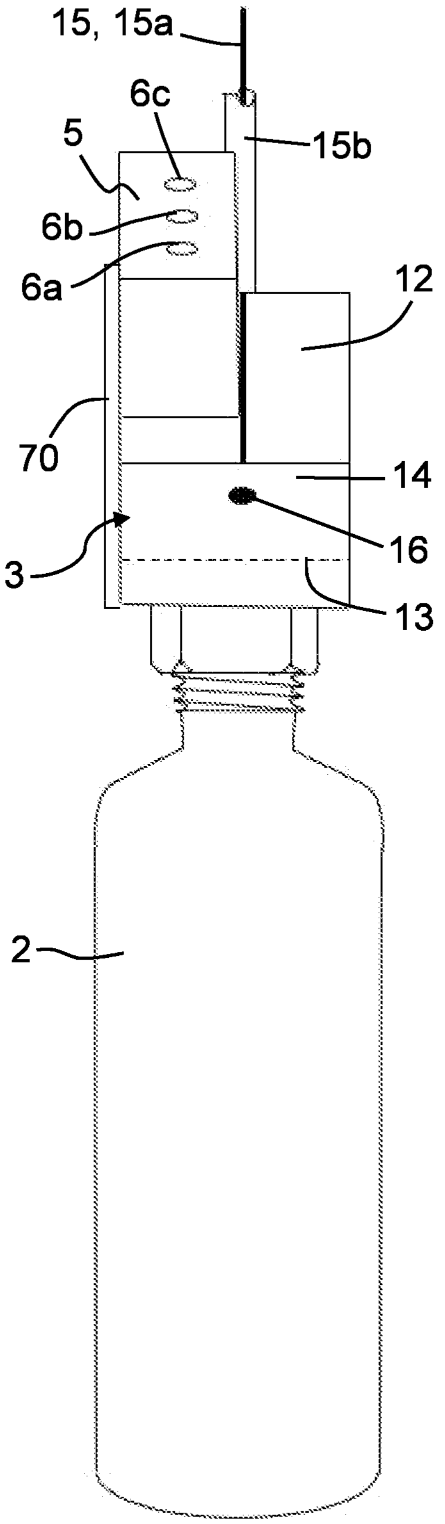
FIG. 3 is a rear elevation view the part of the fire extinguishing arrangement of FIG. 2.
Figure 4:
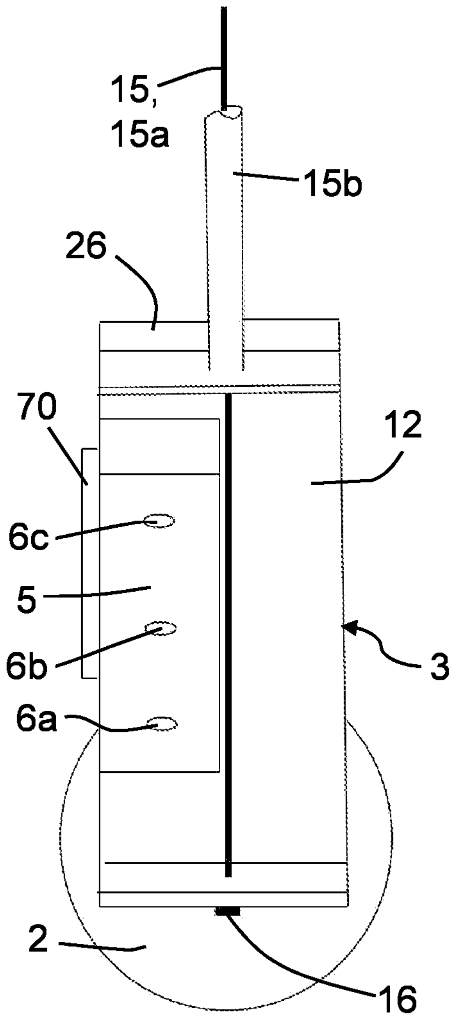
FIG. 4 is a plan view of the part of the fire extinguishing arrangement of FIG. 2.

FIGS. 2 to 4 show the arrangement between the fire extinguisher 2 and the trigger mechanism 3. The fire extinguishing arrangement 1 has an arrangement 5 for stopping an electrical supply to the appliance in which the fire extinguishing arrangement 1 is to be integrated. The arrangement 5 is a microswitch which breaks an electrical circuit when the trigger mechanism 3 is triggered. The fire extinguishing arrangement 1 further has an arrangement for activating an alarm. In the embodiment in FIGS. 2 to 4, the arrangement 5 for stopping the electrical supply, and the arrangement for activating an alarm are both provided by a microswitch. The microswitch operates by breaking the undesired electrical circuit (i.e. the power-supply circuit to the appliance) in the event of a fire and simultaneously forming a circuit which sounds an audio or visual alarm, or alerts emergency services. The microswitch has three ports 6*a*, 6*b*, 6*c* for receiving electrical wiring and forming a circuit. Mains electricity can be wired into the arrangement 5 for stopping the electrical supply along with an electrical appliance to which the fire extinguishing arrangement 1 is to be incorporated. When the trigger mechanism 3 is operated the arrangement 5 for stopping the electrical supply breaks the circuit between the mains electricity and the electrical appliance. An alarm may also be wired into the microswitch which switches on the fire alarm system when a fire or excessive heat is detected, most preferably, by switching the electrical supply to the appliance from the appliance to the alarm system. Wireless solutions are also within the scope of the invention, where the detection of the trigger mechanism 3 activating could be determined by a sensor which wirelessly transmits a signal to turn off an appliance and/or activate an alarm, for example.

The fire extinguishing arrangement 1 further has an arrangement for detecting a temperature of the fire extinguisher outside of a safe operating temperature. The arrangement in the embodiment on FIG. 1 is provided by a thermal fuse 75 attached to or set beside the fire extinguisher 2, and a wire 76 connecting the arrangement 5 for stopping the electrical supply to the thermal fuse 75. The mains electricity can be wired into the thermal fuse 75 which in turn provides an electrical supply to the arrangement 5 for stopping the electrical supply. The electrical supply of an appliance, such as a washing machine, in which the fire extinguishing arrangement 1 is fitted, can be wired into the arrangement 5 for stopping the electrical supply and the thermal fuse 75. If the temperature around the thermal fuse exceeds 50° C. the thermal fuse will cut the circuit thereby cutting power to the appliance. This can occur during the outbreak of a fire or in the event the electrical appliance is overheating. This ensures that the temperature around the extinguisher 2 does not rise above safe temperatures, at which the extinguisher could potentially rupture or explode. Alternative electrical cut-off arrangements such as a thermostat could be used, but a thermal fuse 75 offers a simple and cost-effective solution for ensuring safety.

The trigger mechanism 3 has a fire extinguisher support component formed as a metal plate 7 with an aperture 8 therethrough and an M16 nut 9 arranged at one end of the aperture 8, welded to the metal plate 7, for receiving and holding the fire extinguisher 2. Alternative devices to an M16 nut may be used provided they retain the fire extinguisher 2 at the fire extinguisher support component. The M16 nut 9 enables the fire extinguisher 2 to be screwed on to the fire extinguisher support component 7, but other means of attachment could be used, or the fire extinguisher could be integrally formed with the fire extinguisher support component 7. The aperture 8 provides access through the fire extinguisher support component 7 to the fire extinguisher 2 when the fire extinguisher 2 is screwed into position on the M16 nut 9. The trigger mechanism 3 further has an activator arrangement 10 formed as a spike 11 appended to a plate 12. The fire extinguisher support component 7 and the activator plate 12 are connected at one end via a hinge 13. The hinge 13 is formed from a flexible sheet of metal that is spot welded to the fire extinguisher support component 7 and the activator plate 12. The spike 11 is aligned with the aperture 8 in the fire extinguisher support component 7 such that when the activator plate 12 and the fire extinguisher support component 7 are laid together, the spike 11 extends through the aperture 8 such that it can engage with the fire extinguisher 2.

The trigger mechanism 3 further involves a biasing means, provided by a coil spring 20, operably engaged with the activator plate 12 for biasing the activator plate 12 against the fire extinguisher support component 7. The spring 20 extends from a base 40 of a biasing arrangement support 41, which in turn extends from the fire extinguisher support component 7. The spring 20 extends through an aperture 42 in the fire extinguisher support component 7 and through an aperture 43 in the activator plate 12. It is retained against the activator plate 12 by hooking it through the aperture 43. The spring 20 can move freely through the aperture 42 of the fire extinguisher support component 7.

The trigger mechanism 3 further involves an arrangement 25 for overcoming the biasing force of the spring 20 and for retaining the activator arrangement 10 in an out-of-use position. A flange 14 extends from the hinge 13 at the activator plate 12 end of the hinge 13. The arrangement 25 for retaining the activator arrangement 10 in an out-of-use position has an elongate operating means 15, provided by a Bowden cable. The operating means 15 has an inner cable 15*a* and an outer sleeve 15*b*. In FIG. 1, the outer sleeve 15*b* is arranged as seven separate sleeves. The inner cable 15*a* and the sleeve 15*b* are coaxial and the sleeve 15*b* can move relative to the inner cable 15*a*. The flange 14 which extends from the hinge 13 has an aperture 45 and the inner cable 15*a* extends therethrough. The inner cable 15*a* further extends along the activator plate 12 such that, in use, the spike 11 is located between the inner cable 15*a* and the fire extinguisher 2. The inner cable 15*a* is anchored at one end to the flange 14 via a flange anchor 16 which is sized greater than the width of the aperture in the flange 14. The opposing end of the inner cable 15*a* could be clamped to a surface, an urging device (as discussed later), or may simply be a free end of the operating means 15.

The arrangement 25 for retaining the activator arrangement 10 in an out-of-use position comprises a retaining element 26 for retaining the activator plate 12 at a distance to the fire extinguisher support component 7. The retaining element 26 is elongate and is connected at one end to fire extinguisher support component 7. At the end of the retaining element 26 opposing the portion connected to the fire extinguisher metal plate 7 is a retaining element aperture 46. The inner cable 15*a* extends through the retaining element aperture 46 such that the inner cable 15*a* extends from the flange 14 and through the retaining element aperture 46. The retaining element 26 is located between the sleeve 15*b* and the flange 14 such that the sleeve 15*b* can urge the retaining element 26 towards the flange 14. The retaining element 26 further has a recess 47 for receiving and retaining the end portion of the activator plate 12. The retaining element 26 is formed from malleable metal such that it can displaced by movement of the activator plate 12 when, for example, the sleeve 15*b* is no longer being urged towards the retaining element 26. This would release the activator plate 12 and allow the spring 20 to draw the activator plate 12 towards the fire extinguisher support component 7. This thereby rapidly pulls the spike 11 towards the fire extinguisher 2. When the activator plate 12 is set in the recess 47 a roughly triangular shape is formed between the inner cable 15*a*, the retaining element 26 and the fire extinguisher support component 7.

The fire extinguishing arrangement 1 further has a support bracket 70 which is connected to, and extends orthogonally from, the fire extinguisher support component 7. The support bracket 70 extends alongside the activator plate 12. The arrangement 5 for stopping the electrical supply is attached to the support bracket 70 in a location overhanging the activator plate 12. When the fire extinguishing arrangement 1 is primed in use, the activator plate 12 is operably engaged with a switch 71 of the arrangement 5 for stopping the electrical supply and can operate the switch 71 and therefore the arrangement 5 for stopping the electrical supply by being moved towards the fire extinguisher metal plate 12. The support bracket 70 may further be used to fix the trigger mechanism 3 to a surface such as the interior side surface of a washing machine.

Figure 6:
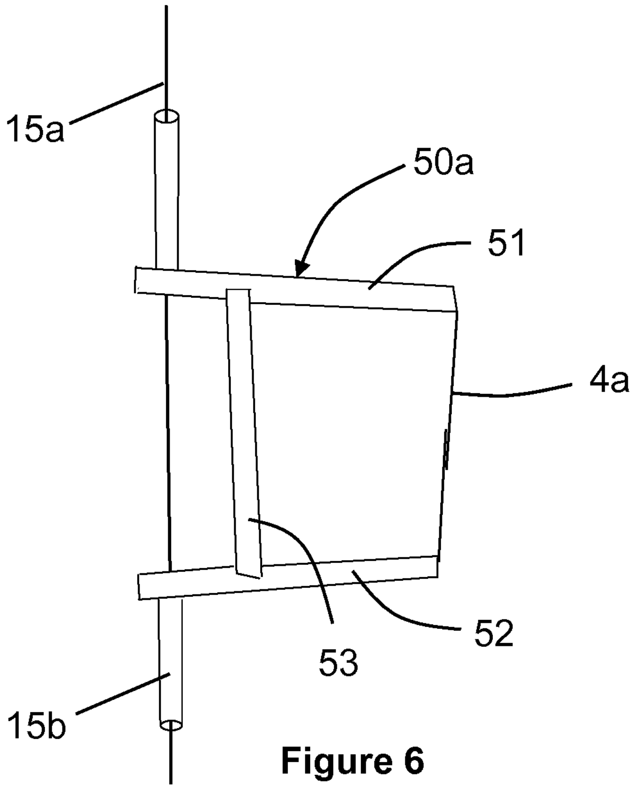
FIG. 6 is a side elevation view of a heat detector and urging means according to the invention.
Figure 7:
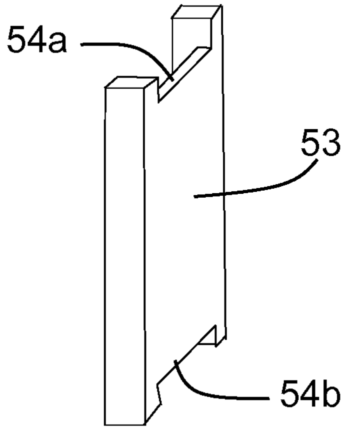
FIG. 7 is a perspective view of a component part of the urging means in FIG. 6.
Figure 8:
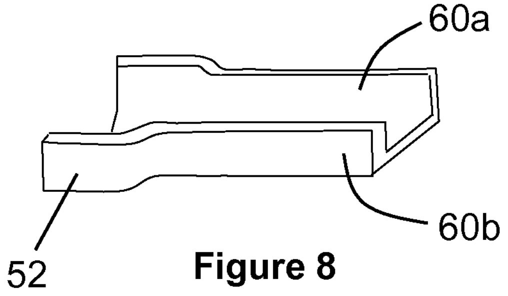
FIG. 8 is a perspective view of another component part of the urging means in FIG. 6.
Figure 9:
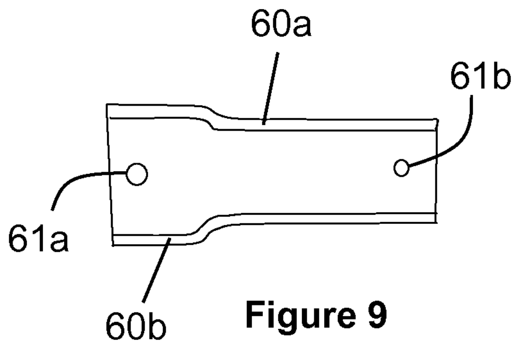
FIG. 9 is a plan view of the component part in FIG. 8.

The fire extinguishing arrangement 1 has a series of six urging devices 50*a*, 50*b*, 50*c*, 50*d*, 50*e*, 50*f* for urging the sleeves 15*b* along the inner cable 15*a* (see FIGS. 1, 6 and 7). Any number of urging devices could be used in conjunction with the operating means 15. Each urging device 50*a*, 50*b*, 50*c*, 50*d*, 50*e*, 50*f* has a first component 51 and a second component 52. The first component 51 and the second component 52 are each formed from a metal sheet with two reinforcing folds 60*a*, 60*b*, along the peripheral edges forming an elongate, U-shaped channel. Each component 51, 52 further has an aperture 61*a*, 61*b* at each end wherein one aperture 61*a* is formed for receiving the inner cable 15*a* and the other aperture 61*b* is formed for attaching a fusible link 4*a* or other heat detector. The inner cable 15*a* of the operating means 15 extends through the first component 51 and the second component 52 but the sleeve 15*b* is retained on one side of the first component 51 and the second component 52. The first component 51 is retained distal to the second component 52 by a separator 53 formed as an elongate metal plate with two seats 54*a*, 54*b* at opposing ends shaped to accommodate the U-shaped channel form of the first component 51 and the second component 52 respectively.

The separator 53 is located between the two apertures of the first component 51 at one end and between the two apertures of the second component 52 at the opposing end. Moving the ends of the first component 51 and the second component 52 respectively that are distal to the operating means 15 closer together causes the components 51, 52 to pivot about the separator and to increase the distance between the ends of the first component 51 and the second component 52 at the operating means 15. This forces the separate sleeves 15*b* apart and can urge the sleeve 15*b* against the retaining element 26. The fusible links 4*a*, 4*b*, 4*c*, 4*d*, 4*e*, 4*f* are formed extending between the end portion of the first component 51 and the end portion of the second component 52 respectively. The urging force can be adjusted by adjusting the length of the fusible links 4*a*, 4*b*, 4*c*, 4*d*, 4*e*, 4*f*. If the fusible link 4*a* breaks, the urging force of the sleeve 15*b* released.

In use, the fire extinguishing arrangement 1 is fitted within and/or around an appliance such as a clothes dryer, dishwasher or washing machine with the purpose of extinguishing a fire initiated by a fault in the appliance. The trigger mechanism 3 can be fixed to the appliance either via the support bracket 70 or otherwise or can simply be set into place within the appliance without securement. The fire extinguishing arrangement 1 is prepared by sliding a first sleeve 15*b* along the inner cable 15*a* and then sliding a first urging device 50*a* along until the first sleeve 15*b* abuts the retaining element 26. Additional sleeves and urging devices are then added. The sleeve 15*b* length can be adjusted to adjust the location and/or number of urging devices present within the fire extinguishing arrangement 1 along the operating means 15.

The activator plate 12 is moved in an arch, pivoting about the hinge 13, away from the fire extinguisher support component 7, and the retaining element 26 is bent towards the activator plate 12 until the end portion of the activator plate 12 is seated within the recess 47 of the retaining element 26. The urging devices 50*a*, 50*b*, 50*c*, 50*d*, 50*e*, 50*f* are adjusted by moving them along the inner cable 15*a* to urge the sleeve 15*b* towards the retaining element 26 thereby holding the activator plate 12 within the recess 47. The end of the inner cable 15*a* distal to the trigger mechanism 3 is retained at or about the urging device furthest from the trigger mechanism 3 by a stopper 17. Alternatively, the terminal end could be clamped to a surface or structure via a clamp, the free end of the operating means 15 could simply have a cap or other structure fixed to the inner cable 15*a* to prevent the terminal outer sleeve 15*b* from sliding off the free terminal end of the inner cable 15*a*.

The spring 20 is then attached to the activator plate 12 by hooking it through the aperture 43, effectively priming the fire extinguishing arrangement. In this configuration the spring 20 will be stretched and will be urging the spike 11 towards the fire extinguisher 2 but the retaining element 26 and the urging force of the sleeve 15*b* retains the activator arrangement 10 in the out-of-use position. Either before or after priming the arrangement, the appliance is electrically wired into the arrangement 5 for stopping the electrical supply and a mains wire is also wired into the arrangement 5 such that a circuit is formed between the mains wire and the appliance. Additionally, a wire is ran from the microswitch of the arrangement 5 for stopping the electrical supply to an alarm system forming a circuit between the alarm system and the mains electricity. The microswitch of the arrangement 5 for stopping the electrical supply is arranged such that the appliance is switched on whilst the alarm system is off and operation of the switch 71 reverses the configuration. The activator plate 12 is arranged in operable engagement with the switch 71 of the arrangement 5 for stopping the electrical supply. The appliance can then be closed and sealed up if necessary, thereby concealing the fire extinguishing arrangement 1.

The spring 20, via the retaining element 26, is constantly forcing the sleeve 15*b* along the inner cable 15*a* away from the retaining element 26, but movement along the cable 15*a* is prevented by the urging devices 50*a*, 50*b*, 50*c*, 50*d*, 50*e*, 50*f*. After the fire extinguishing arrangement 1 has been set into or round an appliance, the heat detectors 4*a*, 4*b*, 4*c*, 4*d*, 4*e*, 4*f* and urging devices 50*a*, 50*b*, 50*c*, 50*d*, 50*e*, 50*f* can be arranged in different locations throughout the appliance. The fire extinguishing arrangement 1 is relatively small and the operating means 15 is thin and easily moveable, so the entire arrangement 1 can be set inside a typical domestic clothes dryer, dishwasher or washing machine, between the exterior of the drum and the interior walls of the casing. An installer can simply open the casing of the appliance, set the fire extinguishing arrangement 1 inside the appliance, and close the casing.

If a fault occurs in the appliance which leads to a fire, at least one of the heat detectors (fusible links 4*a*, 4*b*, 4*c*, 4*d*, 4*e*, 4*f*) incorporated into the urging devices will partially melt or rupture. This causes the urging force of the urging device within which the melted fusible link is located to be released. The urging device can no longer retain the sleeve 15*b* located at either side of the urging device along the inner cable 15*a* apart and the sleeve 15*b* is freed to move along a portion of the inner cable 15*a*. The spring 20 overcomes the retaining element 26 to pull the activator plate 12 out of the recess 47 towards the fire extinguisher support component 7 and push the sleeve 15*b* along the inner cable 15*a* away from the retaining element 26. The activator plate 12 and the fire extinguisher support component 7 snap together. The spike 10 passes through the aperture 8 of the fire extinguisher support component 7 and pierces the fire extinguisher 2 thereby releasing the extinguishant. Movement of the activator plate 12 towards the fire extinguisher support component 7 pulls the switch 71 of the arrangement 5 for stopping the electrical supply, breaking the circuit to the appliance and switching on the circuit to the alarm thereby operating the alarm. The spring 20, via the retaining element 26, is operable to push the sleeve 15*b* and any number of the urging devices 50*a*, 50*b*, 50*c*, 50*d*, 50*e*, 50*f* along the inner cable 15*a* in the event of one of the fusible links 4*a*, 4*b*, 4*c*, 4*d*, 4*e*, 4*f* melting.

Figures 13A, 13B:
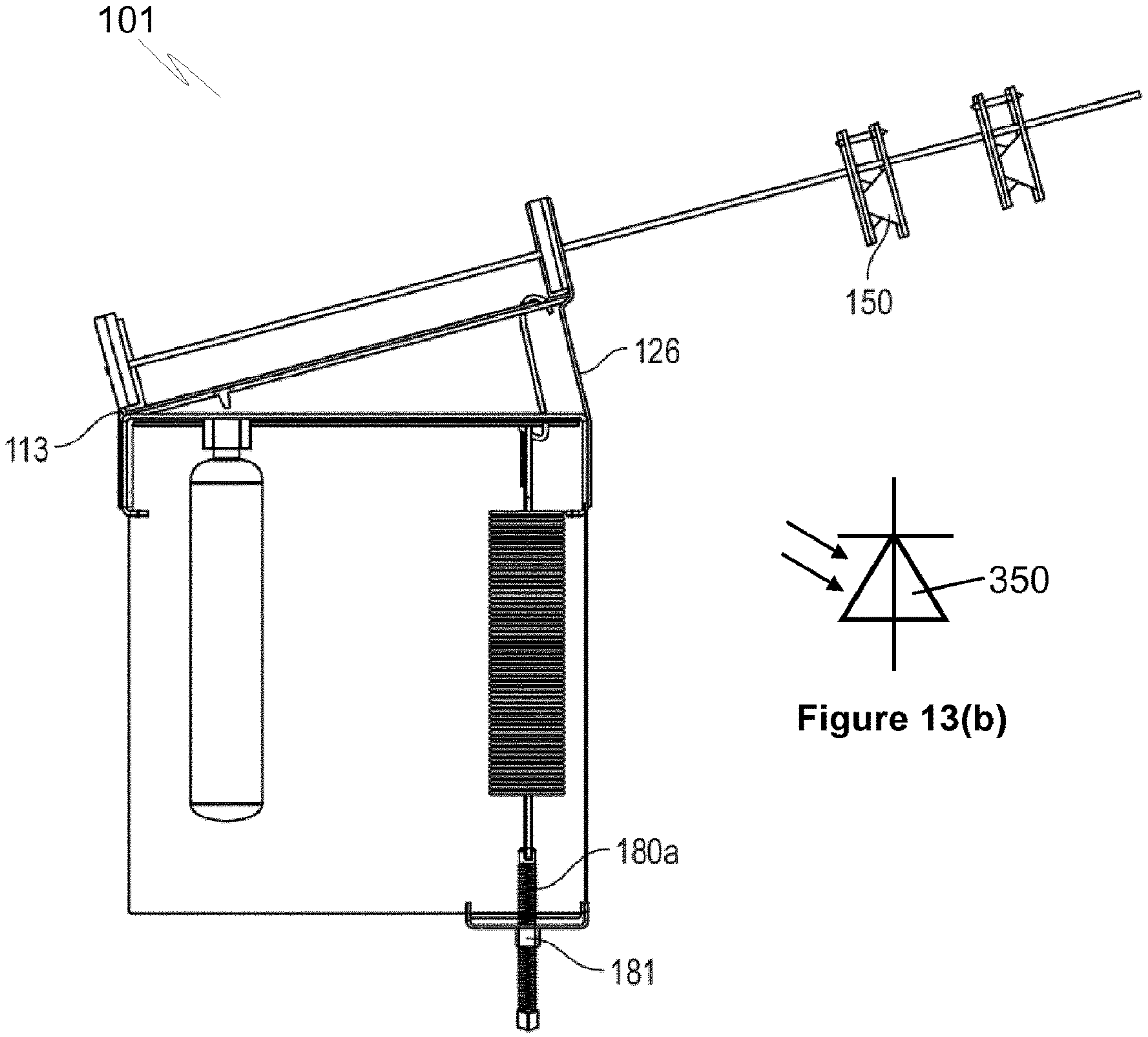
FIG. 13(*a*) is a side view of the fire extinguishing arrangement of FIG. 12.

FIGS. 12 and 13 show a further embodiment of a fire extinguishing apparatus indicated generally by reference numeral 101. The fire extinguishing apparatus 101 has an adjuster 180 which is operably connected to the biasing means 120. The biasing means 120, which is a coil spring in this embodiment, terminates in a hook 120*a* that engages with a through-bore on the adjuster 180. The adjuster 180 has a threaded bolt 180*a* that extends through an aperture 181 in the base 140 of the biasing arrangement support 141. A nut 181 is threaded onto the threaded bolt 108*a* on the opposing side of the base 140 to that of the biasing means 120. Hooking the biasing means 120 onto the adjuster 180 causes the threaded bolt 180*a* to be pulled in the direction of the biasing means 120 but it is retained at the base 140 by the presence of the nut 181. Moving the nut 181 along the threaded bolt 180*a* thereby alters the amount to the threaded bolt 180*a* that extends towards the biasing means 120 from the base 140 and there in turn alters the tension that the biasing means 120 applies to the activator plate 112.

Figure 14:
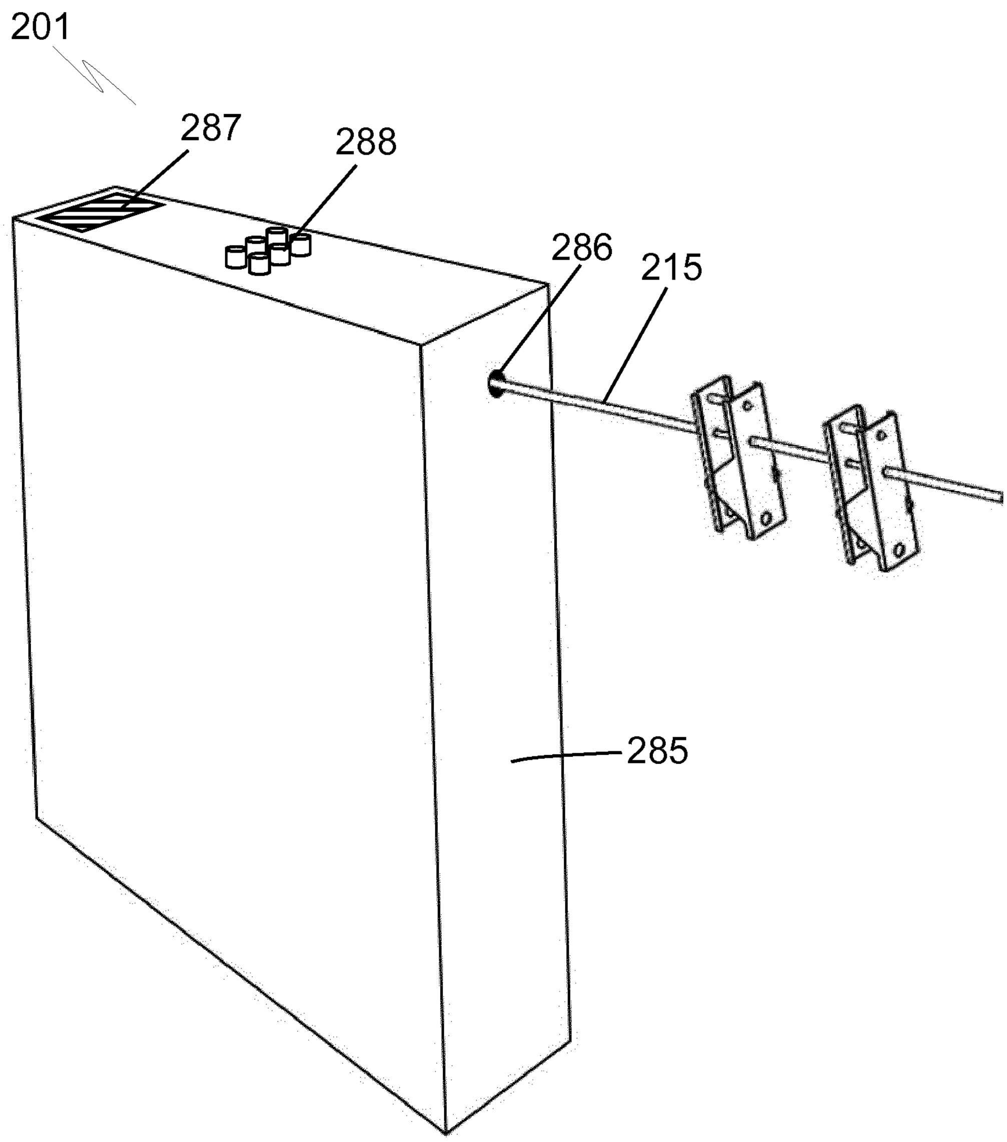
FIG. 14 is a perspective view of a further embodiment of a fire extinguishing arrangement according to the invention.

FIG. 14 is a perspective view of a further embodiment of a fire extinguishing apparatus indicated generally by reference numeral 201. In this embodiment, the trigger mechanism and fire extinguisher are located within an enclosure 285. The enclosure 285 has an aperture 286 for accommodating the operating means 215, and a vent 287 to allow the extinguishant to escape. The enclosure 286 could be fitted with a bracket, adhesive or other means (not shown) for attaching the enclosure 286 to a surface, such as an interior surface of a large domestic electrical appliances. The arrangement for activating an alarm, the arrangement for stopping the electrical supply and/or the electrical cut-off arrangement are each wired to a surface of the enclosure 286. In the embodiment shown, the wiring of these arrangements is accessible via electrical ports 288 on the surface of the enclosure 286.

FIGS. 15 to 18 show views of an embodiment of an urging device indicated by reference numeral 150. In this embodiment, the first component 151 is in direct pivotal engagement with the second component 152. The separator 153 is integrally formed with the first component 151 and second component 152. The separator 152 is provided by two triangular flanges 153*a*, 153*b*, that each extend from respective faces of the first component 151 and second component 152. In use, the flange 153*a* of the first component 151 extends towards and engages with the second component 152, and the flange 153*b* of the second component 152 extends towards and engages with the first component 151. The face 151*a* of the first component 151, and the face 152*a* of the second component 152 each have an aperture 155*a*, 155*b* positioned to receive the flange 153*a*, 153*b* of the other component 151, 152. Each flange 153*a*, 153*b* has a widened portion 156*a*, 156*b* at its tip which prevents the flange 153*a*, 153*b* from easily being removed from the aperture 155*a*, 155*b*, thereby locking the first component 151 to the second component 152 and in pivotal engagement therewith.

Figure 15:
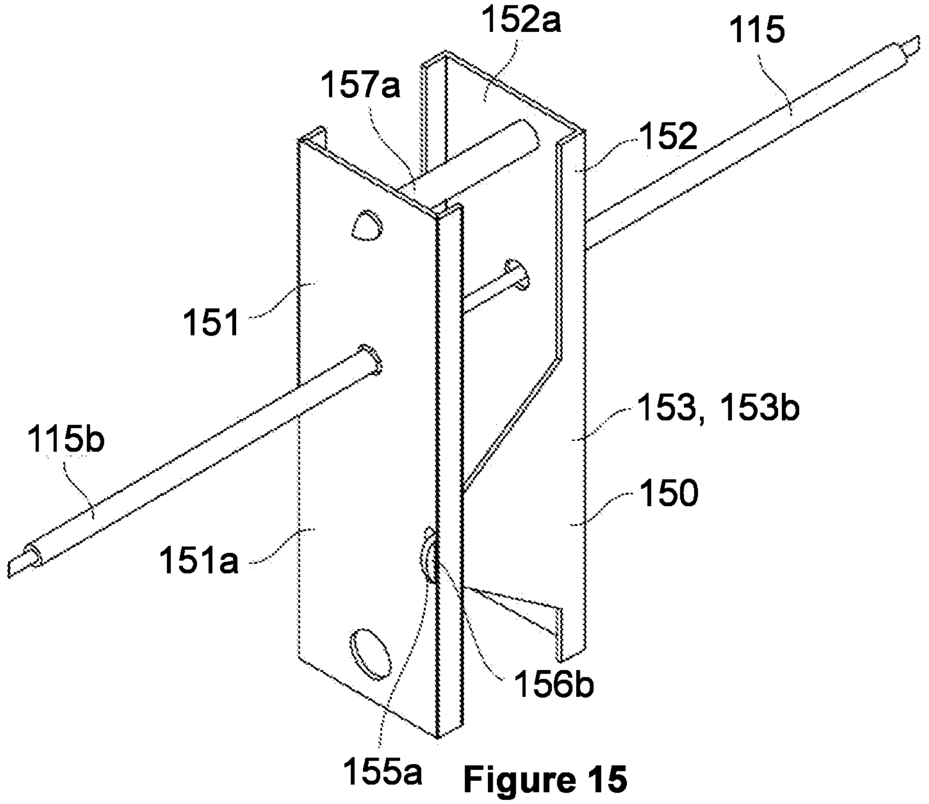
FIG. 15 is an expanded perspective view of an urging means according to the invention in position on an operating means.
Figure 16:
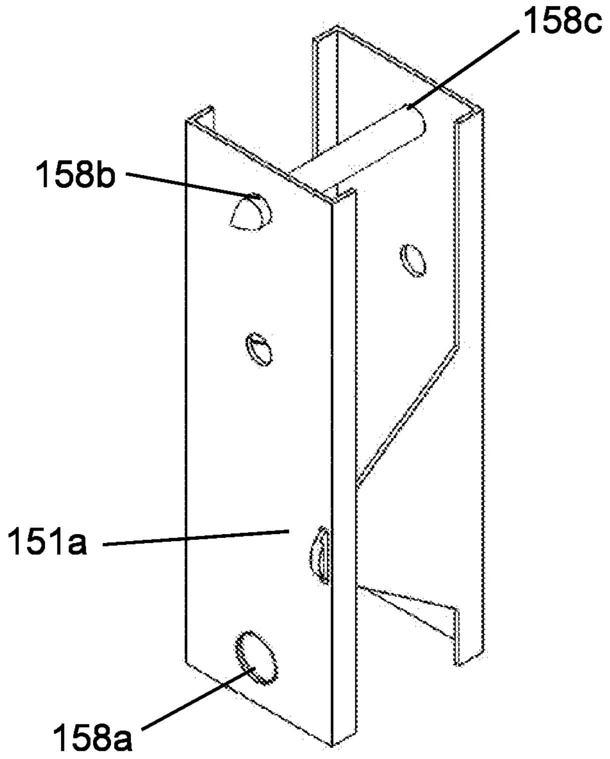
FIG. 16 is an additional view of the urging means of FIG. 15 without the operating means.
Figure 18:
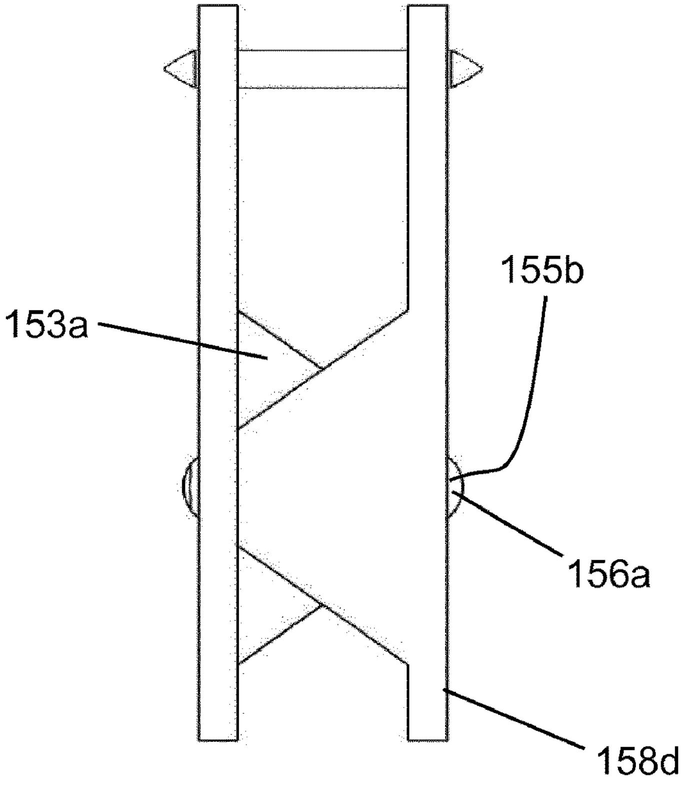
FIG. 18 is a side view of an urging means with a frangible bulb as a heat detector, held in compression.

In FIGS. 15, 16 and 18, the heat detector 157*a* is a frangible bulb. The heat detector 157*a* is located extending between the first component 151 and the second component 152, in particular, extending between an aperture in the face 151*a* of the first component 151 to a corresponding aperture in the face 152*a* of the second component 152. The operating means 115 is arranged extending between the separator 153 and the heat detector 157*a*. In this embodiment, where the sleeve 115*b* is urged towards the first component 151, the first component 151 pivots about the separator 153 towards the second component 153 and consequently applies compression to the heat detector 157*a*. The compressive force is released when the heat detector 157*a* detects heat and bursts and the first and second components 151, 152 swing together about the pivoting separator 153.

Figure 17:
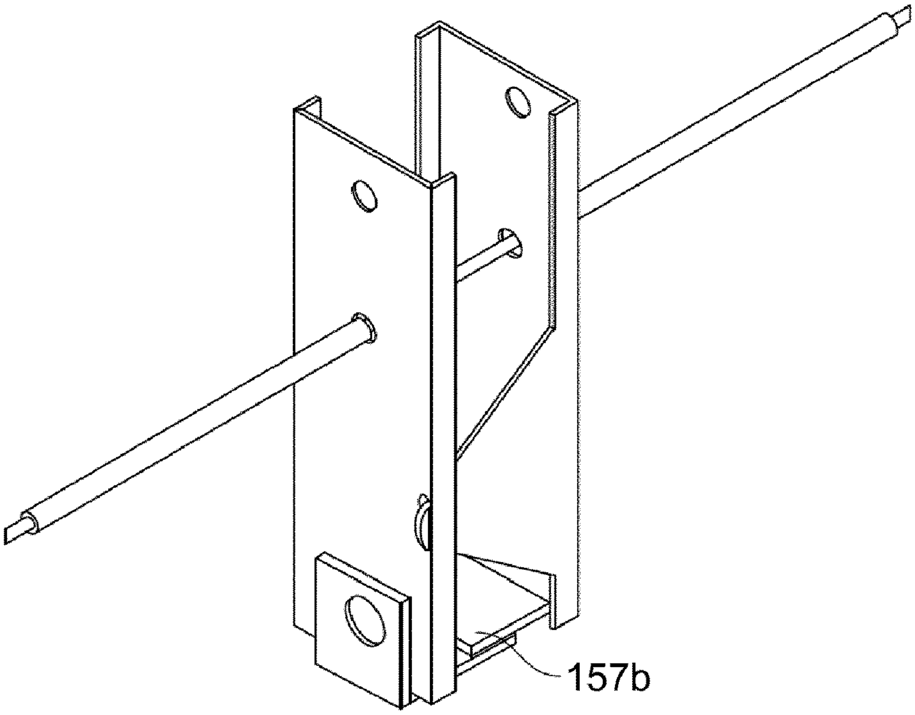
FIG. 17 is a perspective view of an urging means with a fusible link as a heat detector, held in tension.

In FIG. 17, the heat detector 157*b* is a fusible link that is arranged extending between an aperture in the face 151*a* of the first component 151 to a corresponding aperture in the face 152*a* of the second component 152. The link can be fixed to the apertures in the faces 151*a*, 151*b* of the first and second component respectively by screw or bolt or other means, and they each extend underneath the separator 153, being linked at a location between the faces 151*a*, 152*a* of the first 151 and second 152 components. In this arrangement, the separator 153 is between the heat detector 157*b* and the operating means 115. In this embodiment, where the sleeve 115*b* is urged towards the first component 151, the first component 151 pivots about the separator 153 towards the second component 152 and consequently applies a tension to the heat detector 157*b*. The tension is released when the heat detector 157*b* separates, for example because of heat, and the first and second components 151, 152 swing together about the pivoting separator 153. The outer sleeve 115*b* can then move relative to the inner cable 115*a* and the trigger mechanism is triggered, causing the fire extinguisher 102 to release the extinguishant. The same urging device 150 can be used in either of the described arrangements and has apertures 158*a*, 158*b*, 158*c*, 158*d* located at either end of the faces 151*a*, 152*a* of the first and second components 151,

152 to receive a heat detector in either a compressive force arrangement or a tension force arrangement, depending on the placement of the heat detector relative to the separator 153 and the operating means 115.

FIGS. 24 and 25 show a component part 190 of the trigger mechanism 103. The part 190 forms the activator plate 112 and is further shaped to receive and support the hinge 113 at one end 191, and the retaining arrangement 126 at the other end 192. FIG. 25 shows the component part 190 before it is folded into its final shape, whereas FIG. 24 shows the final form of the component part 190. The two end portions of the flat piece are bent at 90°, and then the sides of the bent end portions are folded inwards to produce reinforcing flanges 193 for strength. The hinge 113 can then be fit on to one end 191, and the retaining arrangement 126 on the opposing end 192.

FIGS. 27 and 28 show yet a further component part 195 of the fire extinguishing apparatus 101. Component 195 forms the fire extinguishing support component 107, the biasing arrangement support 140, and the biasing arrangement support base 141. It is also shaped to receive and support part of the hinge 113 and the retaining arrangement 126. The component 195 is formed from a single piece of folded metal. A flat piece of metal is formed initially and then the biasing arrangement support base 141 is formed by a 90° bend, the sides of the base also being folded for reinforcing purposes. The fire extinguishing support component 107 is formed by bending a portion of the component 195 at an opposing end to the biasing arrangement support base 141. The ends of the fire extinguishing support component 107 are folded downwards towards the biasing arrangement support base 141. One end 196 receives and supports part of the hinge 113, and the opposing end 197 receives and supports the retaining arrangement 126. The component part 190 and component part 195 are fitted together, along with the hinge 113 and retaining arrangement 128 to form a large part of the structure of the trigger mechanism 103. A fire extinguisher 102 is screwed onto the fire extinguishing support component 107 and the biasing means 120 placed into position, the operating means 115 is also placed into position at the fire extinguishing support component 107.

The fire extinguishing arrangement could be modified by using an electrically-powered heat detecting means, such as an infra-red sensor 350 (see FIG. 13(*b*)) which transfers a signal to the trigger mechanism, either through wired or wireless means, to trigger the fire extinguishing arrangement. The trigger mechanism could be arranged with a solenoid actuator (not shown) that, upon receiving a signal from the infra-red sensor or other electrically-powered heat detector, moves the position of the retaining element such that the biasing means can move the activator towards the fire extinguisher.

In the preceding discussion of the invention, unless stated to the contrary, the disclosure of alternative values for the upper or lower limit of the permitted range of a parameter, coupled with an indication that one of the values is more highly preferred than the other, is to be construed as an implied statement that each intermediate value of the parameter, lying between the more preferred and the less preferred of the alternatives, is itself preferred to the less preferred value and also to each value lying between the less preferred value and the intermediate value.

The features disclosed in the foregoing description or the following drawings, expressed in their specific forms or in terms of a means for performing a disclosed function, or a method or a process of attaining the disclosed result, as appropriate, may separately, or in any combination of such features be utilised for realising the invention in diverse forms thereof as defined in the appended claims.

The invention claimed is:

1. A fire extinguishing arrangement for integration into a washing machine, the washing machine being powered by an electrical supply, the fire extinguishing arrangement comprising: a fire extinguisher that is sized and shaped such that it can be set in the free internal space around the inner workings of the washing machine; a trigger mechanism that is operable to trigger the fire extinguisher to release an extinguishant; at least one heat detector capable of operating the trigger mechanism when a pre-set temperature is reached, the at least one heat detector being placeable at a remote location to the fire extinguisher, and; the fire extinguishing arrangement comprising a means for stopping the electrical supply when the at least one heat detector detects a pre-set temperature, and wherein the trigger mechanism comprises an activator means for activating the extinguisher to release the extinguishant, and an operating means that operably connects the at least one heat detector to the activator means and wherein forces are exchangeable between the activator means and the at least one heat detector via the operating means, the operating means comprising an inner cable and at least one sleeve, the inner cable extending through the at least one sleeve, wherein the at least one sleeve is retained in a predetermined position relative to the inner cable by the at least one heat detector and upon detection of fire by the at least one heat detector, the at least one sleeve is released and can move relative to the inner cable, the trigger mechanism being configured to trigger the fire extinguisher upon movement of the at least one sleeve relative to the inner cable.

2. The fire extinguishing arrangement as claimed in claim 1, comprising at least one urging means for urging the at least one sleeve of the operating means against a structure and wherein the at least one heat detector is operably integrated with the at least one urging means, and the at least one heat detector and the at least one urging means operate together to retain the at least one sleeve in a predetermined position relative to the inner cable.

3. The fire extinguishing arrangement as claimed in claim 2, wherein the at least one urging means comprises a first component and a second component wherein each component is capable of engaging with the at least one sleeve and moving the at least one sleeve relative to the inner cable.

4. The fire extinguishing arrangement as claimed in claim 3, wherein the inner cable of the operating means extends through and between the first component and the second component, but the at least one sleeve is retained such that it does not extend between first component and second component.

5. The fire extinguishing arrangement as claimed in claim 3, wherein the at least one heat detector is arranged extending between the first component and the second component.

6. The fire extinguishing arrangement as claimed in claim 2, wherein the activator means has an out-of-use position and an activating position, the activator means being movable between the out-of-use position and the activating position.

7. The fire extinguishing arrangement as claimed in claim 6, wherein the trigger mechanism comprises a biasing means for biasing the activator means towards the activating position for activating the extinguisher.

8. The fire extinguishing arrangement as claimed in claim 7, wherein the trigger mechanism comprises a means for releasably retaining the activator means in the out-of-use position.

9. The fire extinguishing arrangement as claimed in claim 8, wherein the at least one heat detector is operably engaged with the means for releasably retaining the activator means in the out-of-use position and wherein on the detection of fire the at least one heat detector causes the means for releasably retaining the activator means in the out-of-use position to release the activator means.

10. The fire extinguishing arrangement as claimed in claim 9, wherein the means for releasably retaining the activator means in the out-of-use position comprises a retaining element for retaining the activator means in the out-of-use position and wherein the operating means is operably engaged with the retaining element.

11. The fire extinguishing arrangement as claimed in claim 10, wherein the retaining element comprises an aperture for receiving the inner cable of the operating means and wherein the at least one sleeve of the operating means is retained on one side of the retaining element whereas the inner cable extends through to the other side of the retaining element.

12. The fire extinguishing arrangement as claimed in claim 11, wherein the at least one urging means is operable to urge the at least one sleeve against the retaining element.

13. The fire extinguishing arrangement as claimed in claim 1, wherein the fire extinguishing arrangement can be retrofitted into an existing washing machine without requiring any substantial modification to the washing machine.

14. The fire extinguishing arrangement as claimed in claim 1, wherein the fire extinguishing arrangement is a standalone arrangement that does not require an extraneous source of extinguishant.

15. The fire extinguishing arrangement as claimed in claim 1, wherein the trigger mechanism is operable to activate the means for stopping the electrical supply.

16. The fire extinguishing arrangement as claimed in claim 1, wherein the fire extinguishing arrangement comprises a means for activating an alarm when the at least one heat detector detects a pre-set temperature wherein the trigger mechanism is operable to activate the means for activating an alarm.

17. The fire extinguishing arrangement as claimed in claim 1, comprising a means for detecting a temperature of the fire extinguisher outside of a safe operating temperature, wherein the means for detecting a temperature of the fire extinguisher outside of a safe operating temperature comprises an electrical cut-off means for cutting off the electrical supply when a predetermined temperature is reached.

* * * * *